United States Patent
Nagai et al.

[11] Patent Number: 5,320,497
[45] Date of Patent: Jun. 14, 1994

[54] VACUUM FEEDING APPARATUS

[75] Inventors: Shigekazu Nagai; Akio Saitoh; Hiroshi Matsushima; Masamichi Tajima, all of Ibaraki, Japan

[73] Assignee: SMC Kabushiki Kaisha, Tokyo, Japan

[21] Appl. No.: 851,540

[22] Filed: Mar. 13, 1992

[30] Foreign Application Priority Data

Jun. 26, 1991 [JP] Japan ............... 3-048659[U]
Jun. 28, 1991 [JP] Japan ............... 3-159047
Jul. 17, 1991 [JP] Japan ............... 3-177042
Sep. 10, 1991 [JP] Japan ............... 3-072795[U]

[51] Int. Cl.$^5$ .................................. F04F 5/48
[52] U.S. Cl. ...................... 417/186; 417/188; 417/189
[58] Field of Search ............ 417/186, 187, 188, 189, 417/84; 294/64.2

[56] References Cited

U.S. PATENT DOCUMENTS

| | | |
|---|---|---|
| 3,275,165 | 9/1966 | Vedvik . |
| 3,513,876 | 5/1970 | Tarbox ............... 137/596 |
| 3,589,387 | 6/1971 | Raymond . |
| 3,933,388 | 1/1976 | Conboy . |
| 4,432,701 | 2/1984 | Ise ............... 294/64.2 |
| 4,495,968 | 1/1985 | Kist . |
| 4,549,854 | 10/1985 | Yamamoto ............... 417/187 |
| 4,600,363 | 7/1986 | Ise et al. ............... 417/187 |
| 4,655,692 | 4/1987 | Ise ............... 417/187 |
| 4,687,021 | 8/1987 | Ise et al. ............... 137/526 |
| 4,806,070 | 2/1989 | Poux et al. . |
| 4,828,306 | 5/1989 | Blatt ............... 417/187 |
| 4,865,521 | 9/1989 | Ise et al. ............... 417/187 |
| 4,932,630 | 6/1990 | Kumar et al. . |

FOREIGN PATENT DOCUMENTS

| | | |
|---|---|---|
| 0281510 | 9/1988 | European Pat. Off. . |
| 36469 | 4/1965 | Fed. Rep. of Germany . |
| 250116 | 10/1966 | Fed. Rep. of Germany . |
| 1523213 | 3/1968 | France . |
| 1538964 | 8/1968 | France . |
| 2031737 | 11/1970 | France . |
| 154900 | 6/1988 | Japan ............... 417/84 |
| 63-193797 | 12/1988 | Japan . |
| WO89/00965 | 2/1989 | PCT Int'l Appl. . |
| 1560008 | 1/1980 | United Kingdom . |
| 1598332 | 9/1981 | United Kingdom . |
| 2074293 | 10/1981 | United Kingdom . |
| 2124343 | 2/1984 | United Kingdom . |
| 2178140 | 2/1987 | United Kingdom . |
| 2195746 | 4/1988 | United Kingdom . |

OTHER PUBLICATIONS

Maschinenmarkt-Industriejournal, pp. 991–993, 1971, Hans-Dieter Nowak, "Luft Statt Elektronen".
Steuerungstechnik, No. 2, pp. 37–45, 1971, B. Staiger, "Universal Element".

*Primary Examiner*—Richard A. Bertsch
*Assistant Examiner*—Roland G. McAndrews, Jr.
*Attorney, Agent, or Firm*—Oblon, Spivak, McClelland, Maier & Neustadt

[57] ABSTRACT

Disclosed herein is a vacuum feeding apparatus for causing a working device such as a suction pad to communicate with a vacuum port so as to enable the working device to attract and hold a work or feed it to a desired position. In the vacuum feeding apparatus, components such as a valve section, a vacuum section, a filter section, a pressure detecting section, a manifold section, etc. are produced in blocks or units respectively. These blocks indicative of the above components can selectively be used in combination. In addition, a plate mounted on a corresponding block can be used to selectively make the changeover of any one of a plurality of fluid passages defined in the block and to cut off the selected passage.

34 Claims, 39 Drawing Sheets

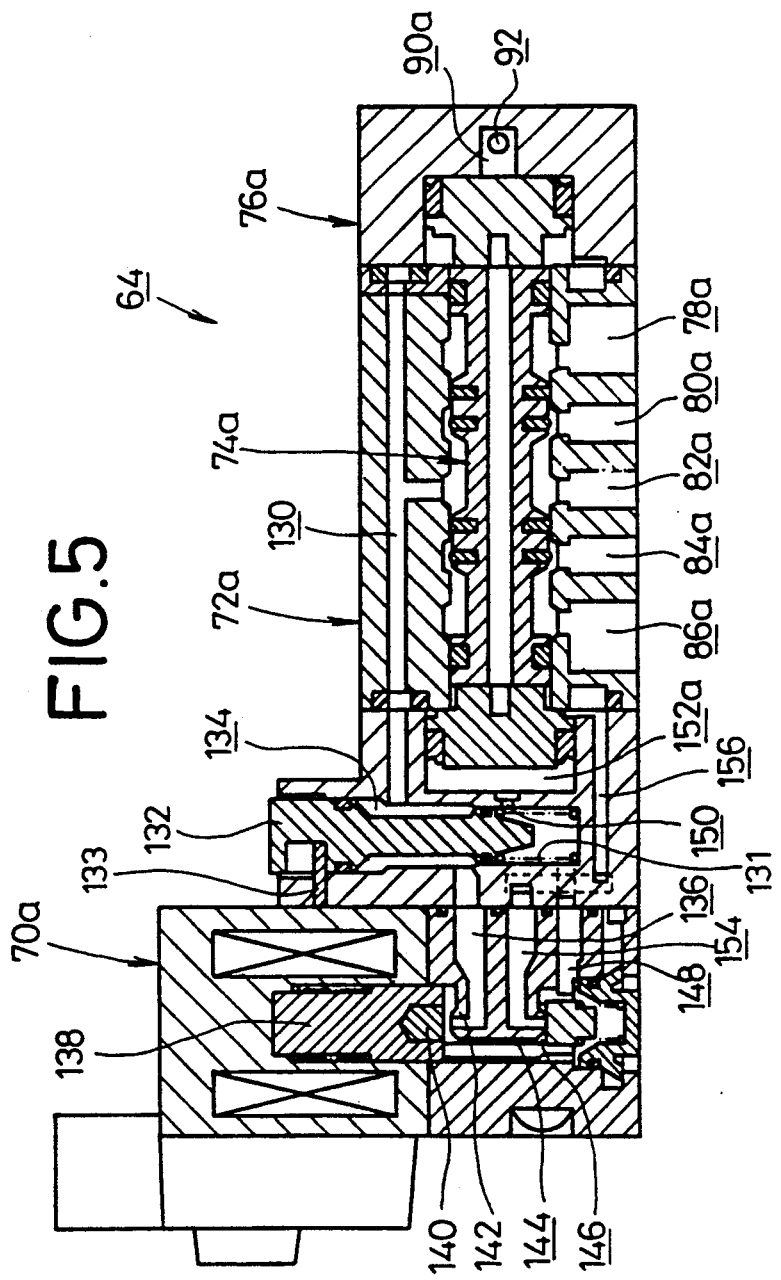

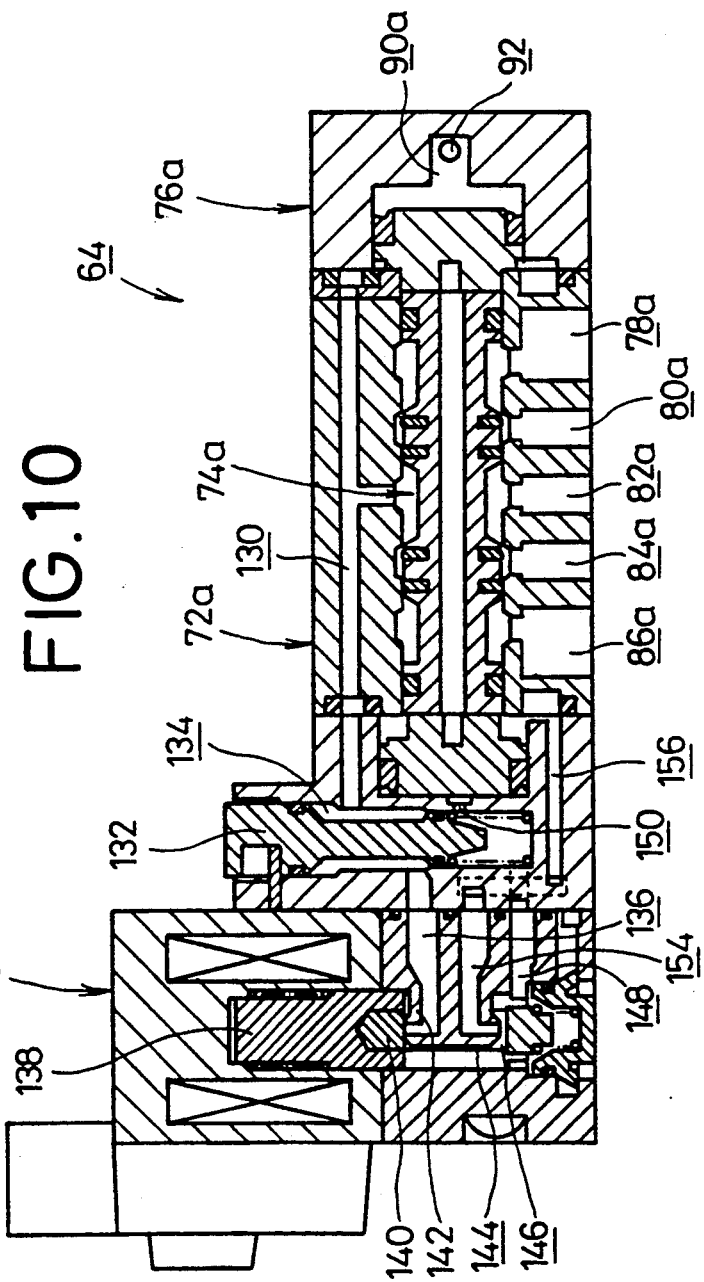

VACUUM FEEDING APPARATUS

BACKGROUND OF THE INVENTION

1. Field of the Invention

The present invention relates to a vacuum feeding apparatus, and more specifically to a vacuum feeding apparatus of a type wherein components of the vacuum feeding apparatus, such as a valve section, a vacuum section, a filter section, a pressure detecting section, a manifold section, etc. are created in the form of blocks or units so as to enable the so-produced blocks to be selectively used in combination, and a plate can be used so as to cut off a plurality of fluid passages defined in the blocks or to selectively make the changeover of the fluid passages.

2. Description of the Related Art

In recent years, there has widely been used a suction pad using a vacuum, as a work attracting and feeding device with a view toward automatically controlling operations in a factory and eliminating labor.

In the work attracting and feeding device referred to above, there have normally been used an ejector system or type for generating a vacuum with compressed air and a vacuum pump system or type for energizing a vacuum pump to generate a vacuum. Either a solenoid-controlled valve or a solenoid-controlled pilot valve, for example, is normally coupled to both types mentioned above.

The prior art referred to above, however, has the following problems.

Described specifically, it is necessary to selectively make the changeover of the ejector type and the vacuum pump type as needed. Then, constituent devices such as a solenoid-controlled valve, a solenoid-controlled pilot valve, etc. are exchanged with others according to various uses. At this time, a pipe arrangement process is extremely cumbersome because such devices are coupled to one another by means of lines or pipes. In addition, the provision of a number of devices causes a problem when a vacuum feeding apparatus is reduced in size.

SUMMARY OF THE INVENTION

It is a principal object of the present invention to provide a vacuum feeding apparatus which can provide a simple pipe arrangement process and can be produced on a small scale.

It is another object of the present invention to provide a vacuum feeding apparatus of a type wherein respective components of the apparatus are created in the form of blocks and the blocks thus created are selected as needed, thereby making it possible to achieve desired functions.

It is a further object of the present invention to provide a vacuum feeding apparatus of a type wherein a plate is inserted in space between adjacent components shaped in the form of blocks to enable either a change of fluid passages or a cutting-off of the fluid passages.

It is a still further object of the present invention to provide a vacuum feeding apparatus which can more accurately detect the degree of a vacuum.

It is a still further object of the present invention to provide a vacuum feeding apparatus which can achieve reduced accumulation of dust or the like and provide an improved useful life.

It is a still further object of the present invention to provide a vacuum feeding apparatus for causing a working device inclusive of a suction pad or the like to communicate with a vacuum port so as to enable the working device to hold a work or feed it to a desired position, which comprises a plurality of block members each having a plurality of passages defined therein, the passages including at least a compressed-air feed passage and an exhaust passage, and at least one plate mounted on a corresponding one of the block members, the plate being used to selectively make the changeover of any one of the plurality of fluid passages and to cut off the selected passage.

It is a still further object of the present invention to provide a vacuum feeding apparatus further comprising a valve unit having a directional control valve for supplying pressurized fluid and a vacuum to a desired position and cutting off the same, and a plate exchanged with another so as to permit a change in a fluid circuit provided in a valve mechanism.

It is a still further object of the present invention to provide a vacuum feeding apparatus further comprising a manifold connectable to the vacuum feeding apparatus provided in continuation in plural form, the manifold being common to the vacuum feeding apparatus provided in plural form and used to supply fluid to a desired position and exhaust the fluid therefrom.

It is a still further object of the present invention to provide a vacuum feeding apparatus further comprising an exchangeable plate inserted in a fluid circuit for connecting the valve unit and the manifold to each other so as to enable the fluid circuit to be cut off.

It is a still further object of the present invention to provide a vacuum feeding apparatus wherein a check valve is interposed between adjacent block members so as to cut off the fluid circuit.

It is a still further object of the present invention to provide a vacuum feeding apparatus activated to communicate with a working device inclusive of a suction pad or the like so as to enable the working device to hold a work or feed it to a desired position, which comprises a valve unit having a directional control valve for supplying pressurized fluid and a vacuum to a desired position and cutting off the same, a vacuum unit for supplying a vacuum to be used to the working device, and a filter unit for removing filth from fluid introduced from the working device, whereby a pressure detecting unit for detecting pressure applied to the working device and a silencer unit for reducing noise including an exhaust sound or the like are selectively incorporated in a combination of the respective units.

It is a still further object of the present invention to provide a vacuum feeding apparatus wherein the vacuum unit is an ejector.

It is a still further object of the present invention to provide a vacuum feeding apparatus wherein the vacuum unit and a vacuum pump can selectively be coupled to each other.

It is a still further object of the present invention to provide a vacuum feeding apparatus wherein the vacuum unit is provided in continuation in plural form by a corresponding manifold.

It is a still further object of the present invention to provide a vacuum feeding apparatus wherein the valve unit comprises a valve mechanism having a directional control valve for supplying either pressurized fluid or a vacuum to a desired position and cutting off the same, a pilot valve unit having a pilot valve for the directional control valve, and a plate mounted between the valve mechanism and the pilot valve unit so as to selectively make the changeover of a fluid passage for enabling the valve mechanism and the pilot valve unit to communicate with each other and to cut off the fluid passage, whereby when the system of the pilot valve is changed to another, the pilot valve and the plate are respectively exchanged with others so as to enable a change in the system of the pilot valve without making a change in the fluid passage in the valve mechanism.

It is a still further object of the present invention to provide a vacuum feeding apparatus wherein the valve unit has a directional control valve for supplying either pressurized fluid or a vacuum to a desired position and cutting off the same, and the directional control valve includes a valve seat and a valve body, the valve body having circumferential grooves which are defined in both ends thereof and in which first and second flexible rings are mounted, and having an intermediate portion on which a third flexible ring having one slanted side face is fixedly mounted, whereas the valve seat having opposed pointed-ends brought into abutment against the slanted face of the third flexible ring when the valve body is blocked against the valve seat.

It is a still further object of the present invention to provide a vacuum feeding apparatus wherein a plate is inserted in space between the valve unit and a member adjacent thereto, and the plate is exchanged with another so as to connect the valve unit and the member to each other in a manner that they are kept airtight and to selectively cut off a plurality of fluid passages defined between the valve unit and the member.

It is a still further object of the present invention to provide a vacuum feeding apparatus wherein a plate is mounted between the valve unit and a member adjacent thereto, and the plate is exchanged with another so as to couple the valve unit and the member to each other in such a manner that they are kept airtight, to selectively cut off a plurality of fluid passages defined between the valve unit and the member and to selectively make the changeover of a plurality of fluid passages in the valve unit.

It is a still further object of the present invention to provide a vacuum feeding apparatus wherein the plate comprises a first plate used to couple the valve unit and a member having a fluid passage which is defined therein and communicates with the valve unit to each other in such a manner that the valve unit and the member are kept airtight, the first plate being exchanged with another so as to selectively cut off a plurality of fluid passages defined between the valve unit and the member, and a second plate exchanged with another thereby to make it possible to selectively perform the changeover of a plurality of fluid passages in the valve unit, whereby the first and second plates are used in combination so as to selectively cut off the plurality of fluid passages defined between the valve unit and the member and to selectively make the changeover of the plurality of fluid passages in the valve unit.

It is a still further object of the present invention to provide a vacuum feeding apparatus further comprising a pilot valve held in an actuated state when a power failure occurs.

It is a still further object of the present invention to provide a vacuum feeding apparatus wherein the pilot valve includes first and second solenoids and serves as a solenoid-controlled pilot valve firstly actuated to control a directional control valve so as to supply a vacuum therefrom when the first solenoid is energized and then actuated to control the directional control valve so as to cut off the supply of the vacuum therefrom when the second solenoid is energized.

It is a still further object of the present invention to provide a vacuum feeding apparatus wherein the vacuum unit has a passage defined therein which communicates with a vacuum port, and a passage defined therein for causing a detecting unit for detecting pressure applied to the vacuum port to directly communicate with the vacuum port.

It is a still further object of the present invention to provide a vacuum feeding apparatus wherein a check valve is mounted in the passage for causing the detecting unit to directly communicate with the vacuum port.

It is a still further object of the present invention to provide a vacuum feeding apparatus wherein the check valve has a plurality of small holes defined in its body, which enable an upstream side thereof to communicate with a downstream side thereof.

It is a still further object of the present invention to provide a vacuum feeding apparatus wherein a conical reduced portion is formed onto the passage for causing the detecting unit to directly communicate with the vacuum port in such a manner that the radius of the portion is gradually reduced toward a filter portion as seen from its cross-section, and a sphere is brought into abutment against a wall surface of the portion by a resilient member.

It is a still further object of the present invention to provide a vacuum feeding apparatus wherein a small-diameter passage is defined in such a manner as to cause upstream and downstream sides of the portion to communicate with each other.

It is a still further object of the present invention to provide a vacuum feeding apparatus wherein small grooves are defined in either the wall surface of the reduced portion or the surface of the sphere.

It is a still further object of the present invention to provide a vacuum feeding apparatus further including a manifold and wherein a check valve for preventing exhaust from flowing into the ejector through an exhaust passage of the manifold is disposed between the exhaust passage of the manifold and the ejector.

It is a still further object of the present invention to provide a vacuum feeding apparatus wherein a check valve for preventing air in the valve unit from flowing inside is disposed in a passage which communicates with a compressed-air intake port of the ejector.

It is a still further object of the present invention to provide a vacuum feeding apparatus wherein the valve unit includes sealing members which are of floating type diaphragms formed of ring-shaped flexible materials and inserted in recesses defined in both of the valve body and the valve seat.

It is a still further object of the present invention to provide a vacuum feeding apparatus wherein the recesses defined in the valve body and the valve seat respectively are positionally displaced in the direction in which the valve body is moved so as to obliquely fit and place the floating type diaphragms in the respectively corresponding recesses.

It is a still further object of the present invention to provide a vacuum feeding apparatus further including a manifold which includes two or more surfaces for mounting thereon external devices which communicate with the manifold via piping spaces internally defined in the manifold, the manifold including fluid passages which are defined in the two or more surfaces in an open state and communicate with the external devices respectively, and having a packing groove and mounting internally-threaded bores defined in integral form, the bores being defined to be coupled to at least external parts.

It is a still further object of the present invention to provide a vacuum feeding apparatus wherein the manifold is formed of a synthetic resin in integral form.

It is a still further object of the present invention to provide a vacuum feeding apparatus wherein the valve unit includes a poppet valve which includes a valve body and a valve seat, the valve body having circumferential grooves which are defined in both ends thereof and in which first and second flexible rings are mounted, and having an intermediate portion on which a third flexible ring having one slanted side face is fixedly mounted, whereas the valve seat having opposed pointed-ends brought into abutment against the slanted face of the third flexible ring when the valve body is blocked against the valve seat.

It is a still further object of the present invention to provide a vacuum feeding apparatus wherein the valve seat is formed of a synthetic resin in integral form.

It is a still further object of the present invention to provide a vacuum feeding apparatus wherein fluid passages for allowing a component provided inside any one of the units to communicate with respective fluid devices are perceptible to vision.

It is a still further object of the present invention to provide a vacuum feeding apparatus wherein the component is any one of at least a nozzle, a diffuser, a valve, a silencer element, a filter element and a check valve.

It is a still further object of the present invention to provide a vacuum feeding apparatus wherein either both of at least the nozzle and the diffuser or one of them is formed of a transparent material and fluid passages defined in the nozzle and the diffuser are perceptible to vision.

It is a still further object of the present invention to provide a vacuum feeding apparatus wherein the body of the component is formed of a transparent synthetic resin in the form of a single unit.

It is a still further object of the present invention to provide a vacuum feeding apparatus wherein a space is defined between the ejector and a different member disposed adjacent to the ejector in such a manner as to communicate with a diffuser of the ejector and serve as a fluid exhaust passage for reducing a fluid exhaust sound.

It is a still further object of the present invention to provide a vacuum feeding apparatus wherein the different member disposed adjacent to the ejector is of a detecting unit for detecting a vacuum.

It is a still further object of the present invention to provide a vacuum feeding apparatus wherein the different member disposed adjacent to the ejector is of a manifold.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 5 is a cross-sectional view illustrating a first solenoid-controlled pilot valve of the vacuum feeding apparatus, which has been opened;

FIG. 10 is a cross-sectional view illustrating the first solenoid-controlled pilot valve of the vacuum feeding apparatus, which has been closed;

DETAILED DESCRIPTION OF THE PREFERRED EMBODIMENTS

Figure 1:
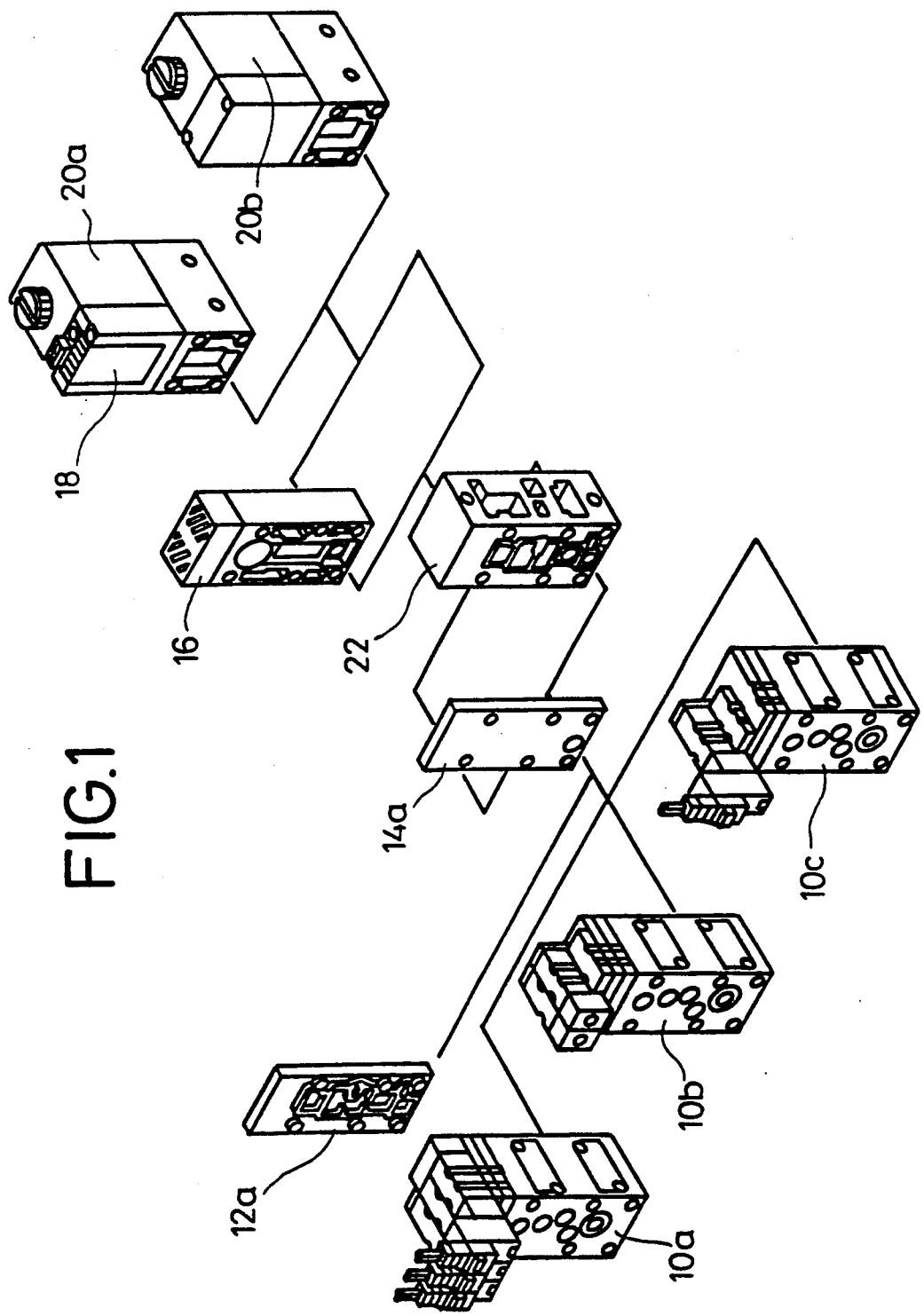
FIG. 1 is a view for describing the manner in which vacuum feeding apparatuses according to the present invention are to be combined together.

Referring now to FIG. 1, a schematic description will now be made of the manner in which vacuum feeding apparatuses according to the present invention are combined together. Functions and operations of each of the combined vacuum feeding apparatuses will be described later.

As shown in FIG. 1, valve units, vacuum units, filter units, etc. which constitute the present invention, are respectively shaped in the form of blocks or units for every functions. As valve units for supplying pressurized fluid and a vacuum and cutting off their supply, there are used, for example, a double solenoid type valve unit 10a, an air-operated valve unit 10b, a normally-opened valve unit 10c, which are compatible with one another.

A function plate 12a is mounted on each of the valve units 10a through 10c when an internal fluid circuit is changed. In addition, a connecting plate 14a is used to connect adjacent units to one another in hermetic state. An ejector 16 may also be used as a vacuum unit.

Furthermore, filter units 20a, 20b each formed integrally with a pressure detecting unit 18 are provided so as to have compatibility.

When the vacuum feeding apparatus is provided in continuation in plural form, a manifold 22 may be used.

These components can suitably be combined together depending on the purpose or uses.

Figure 2:
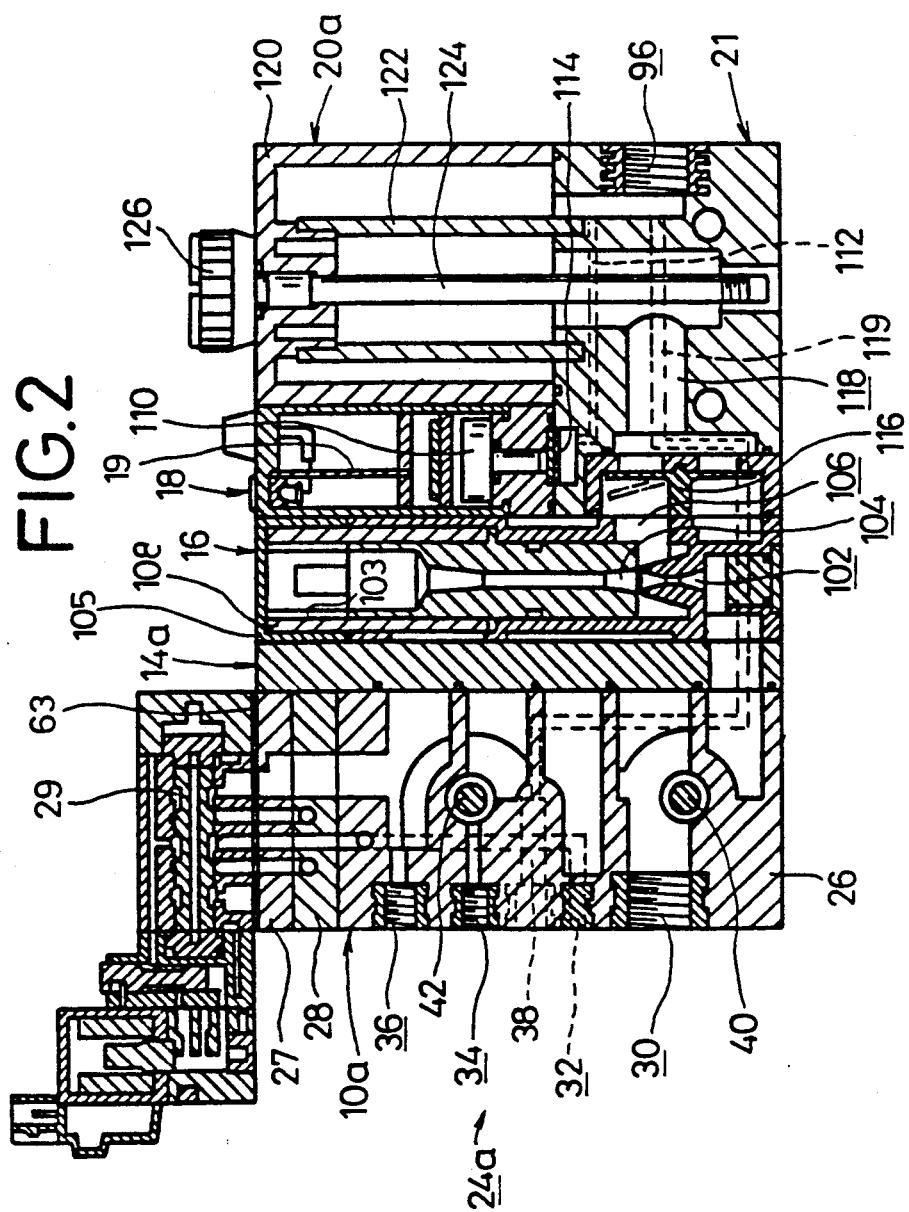
FIG. 2 is a cross-sectional view showing a vacuum feeding apparatus with an ejector incorporated therein according to a first embodiment of the present invention.
Figure 3:
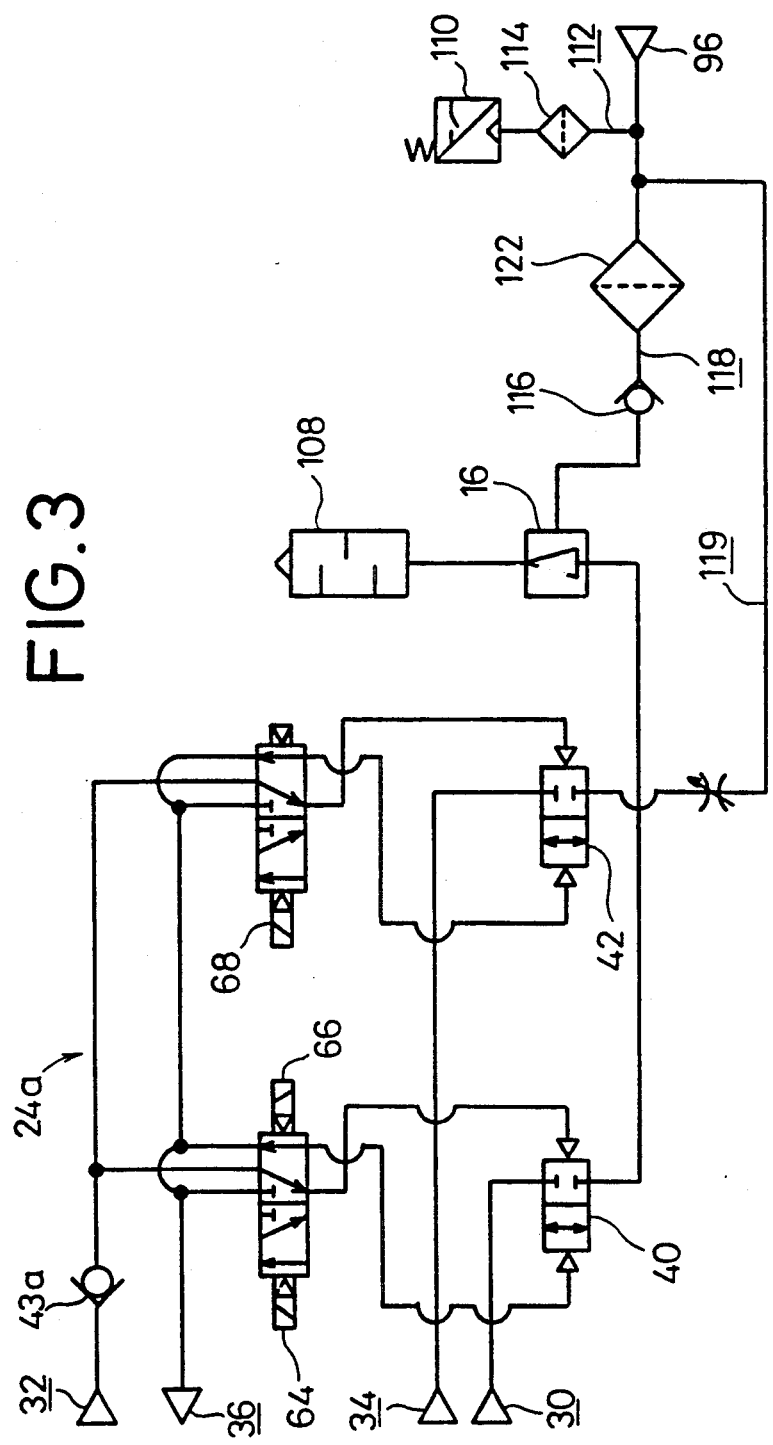
FIG. 3 is a view for describing a fluid circuit of the vacuum feeding apparatus shown in FIG. 2.

A description will now be made of a vacuum feeding apparatus actually assembled by combining components together as an example. A description will first be made of an ejector-type vacuum feeding apparatus 24a, which comprises the double solenoid type valve unit 10a, the connecting plate 14a, the ejector 16 and the filter unit 20a formed integrally with the pressure detecting unit 18 as shown in FIG. 1. The vacuum feeding apparatus 24a is constructed as illustrated in FIGS. 2 and 3. More specifically, the valve unit 10a has a valve mechanism 26 shaped in the form of a rectangle. A solenoid-controlled pilot valve unit 29 is mounted on an upper portion of the valve unit 10a by screws. The connecting plate 14a is brought into abutment against one side face of the valve mechanism 26. A packing is mounted on the valve mechanism 26 side in confronting relationship to each of fluid lines or passages. The packing is brought into abutment against the flat connecting plate 14a, so that the valve mechanism 26 and the connecting plate 14a are kept airtight. The valve mechanism 26 has a feed port 30, a feed port 32 for a pilot valve, a vacuum break port 34 and a discharge or exhaust port 36 for a pilot valve, all of which are defined in the other side face of the valve mechanism 26 as seen from below. Then, internally-threaded holes or bores are defined in the vicinity of the feed port 32 and the vacuum break port 34. A valve body 38 which substantially constitutes a flow control valve, threadedly engages its corresponding internally-threaded bore. The valve mechanism 26 has a two-port/two-position type feed valve 40 and a vacuum breaker or a vacuum break valve 42 disposed internally, whose axial directions extend in the direction normal to the sheet of FIG. 2. In addition, the valve mechanism 26 also has lines or passages defined therein, which cause the feed valve 40, the vacuum break valve 42, the respective ports 30, 32, 34, 36, the solenoid-controlled pilot valve unit 29 and the connecting plate 14a to communicate with one another. There is disposed check valve 43a in one end of the passage which communicates with the feed port 32. The check valve 43a is used to make longer the time required to retain the pressure supplied to the valve body when the supply of compressed air is stopped.

Figure 4A:
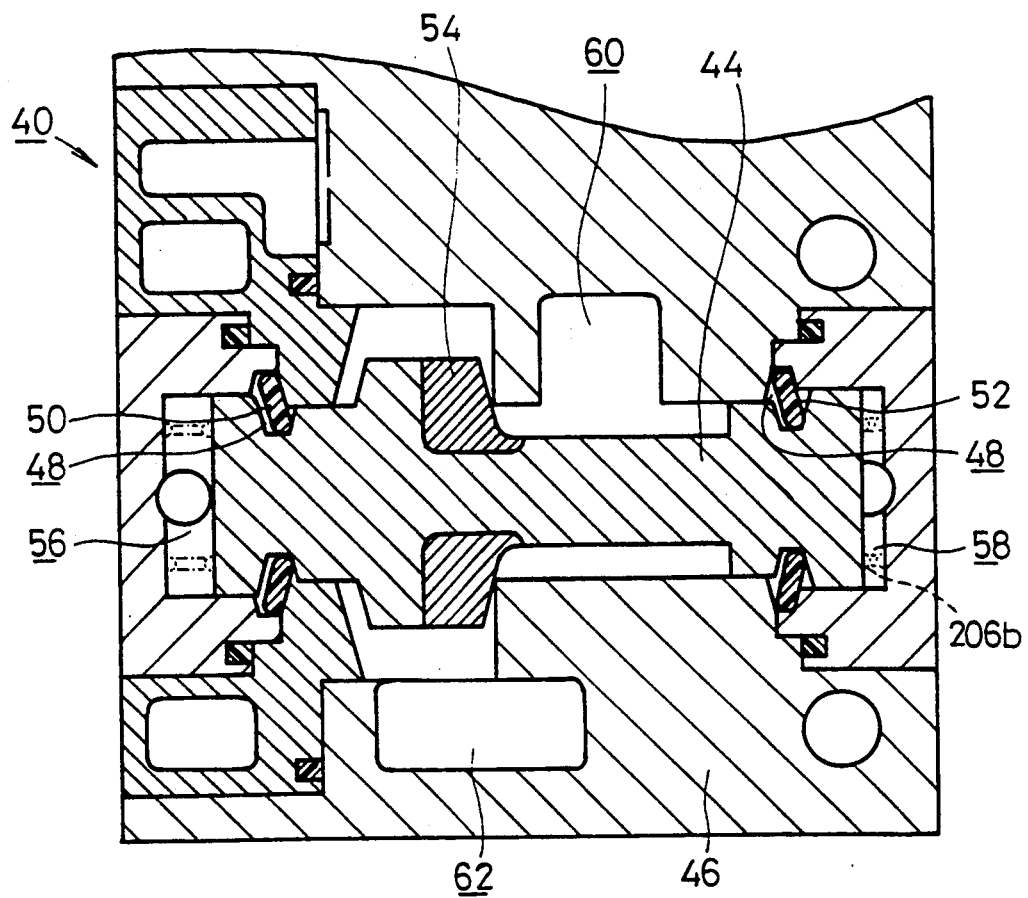
FIGS. 4A and 4B are cross-sectional views showing a feed valve of the vacuum feeding apparatus shown in FIG. 2.
Figure 4B:
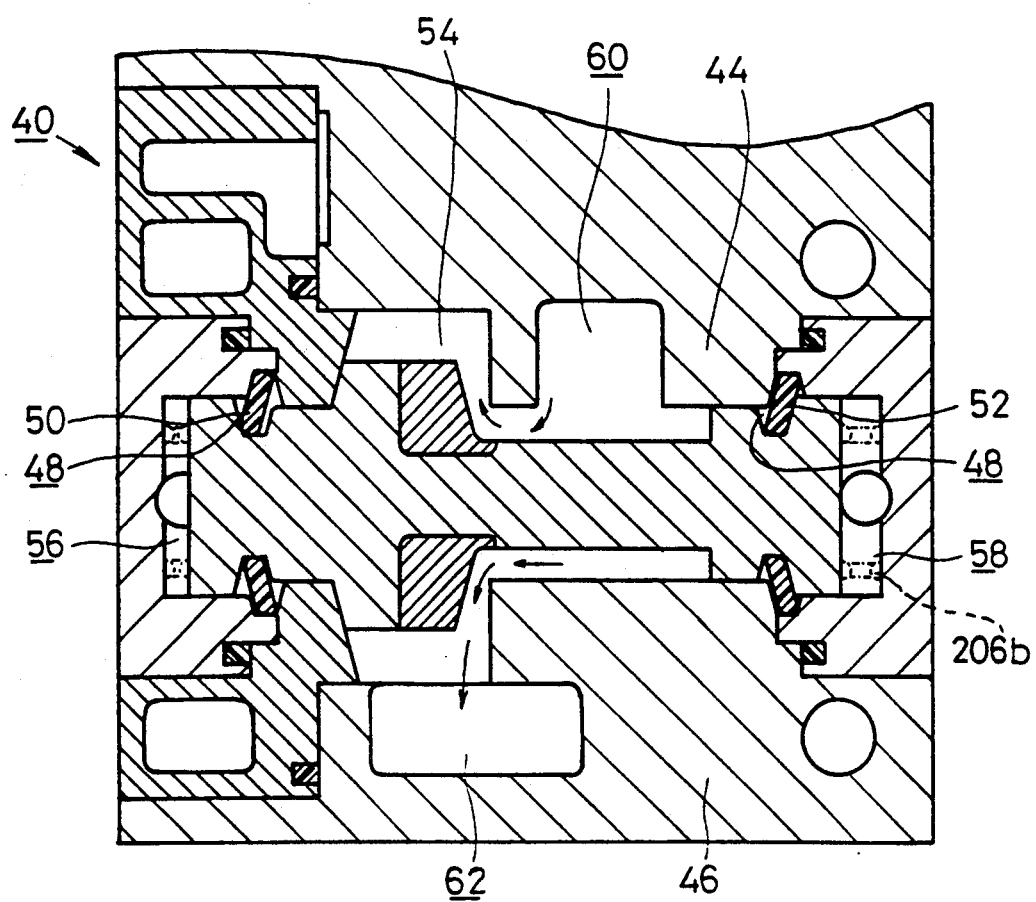

The structure of the feed valve 40 will now be described with reference to FIGS. 4A and 4B. The feed valve 40 comprises a valve body 44 and a valve seat 46. First and second flexible rings 50, 52 are mounted in respectively corresponding circumferential grooves 48 defined in both ends of the valve body 44. In addition, a third flexible ring 54 having a slanted surface is mounted on an intermediate portion of the valve body 44. In the feed valve 40 constructed as described above, fluid supplied from the solenoid-controlled pilot valve unit 29 reach either a first pilot chamber 56 or a second pilot chamber 58 so as to displace the valve body 44 in a desired direction, thereby cutting off spaces 60, 62 from being in communication or causing them to communicate with each other. The vacuum break valve 42 also has substantially the same configuration as that of the feed valve 40. FIG. 4B shows the manner in which the valve body 44 is displaced in the left-hand direction as seen from FIG. 4A. It is apparent from FIG. 4B that the third ring 54 is separated from its seat portion to enable compressed air to flow into the space 62.

This type of pilot valve, i.e., the feed valve 40 makes it unnecessary in its structure to utilize grease used to smoothly actuate a normal pilot valve, thereby making it possible to make the exhaust clean.

The solenoid-controlled pilot valve unit 29 disposed above the valve mechanism 26 with first and second interfaces 27, 28 and a packing 63 interposed therebetween has first, second and third solenoid-controlled pilot valves 64, 66, 68 each of which is used to perform ON/OFF operations of the feed valve 40 and the vacuum break valve 42 of the valve mechanism 26, and each of which is of a five-port/two-position type.

As shown in FIG. 5, the first solenoid-controlled pilot valve 64 basically comprises a solenoid-controlled valve 70a, a seat portion 72a, a main body 74a of the pilot valve, and an end plate 76a. The seat portion 72a has a first port 78a, a second port 80a, a third port 82a, a fourth port 84a and a fifth port 86a defined therein, which respectively communicate with the exhaust port 36, the second pilot chamber 58 of the feed valve 40, the feed port 32, the first pilot chamber 56 of the feed valve 40 and the exhaust port 36.

Figure 6:
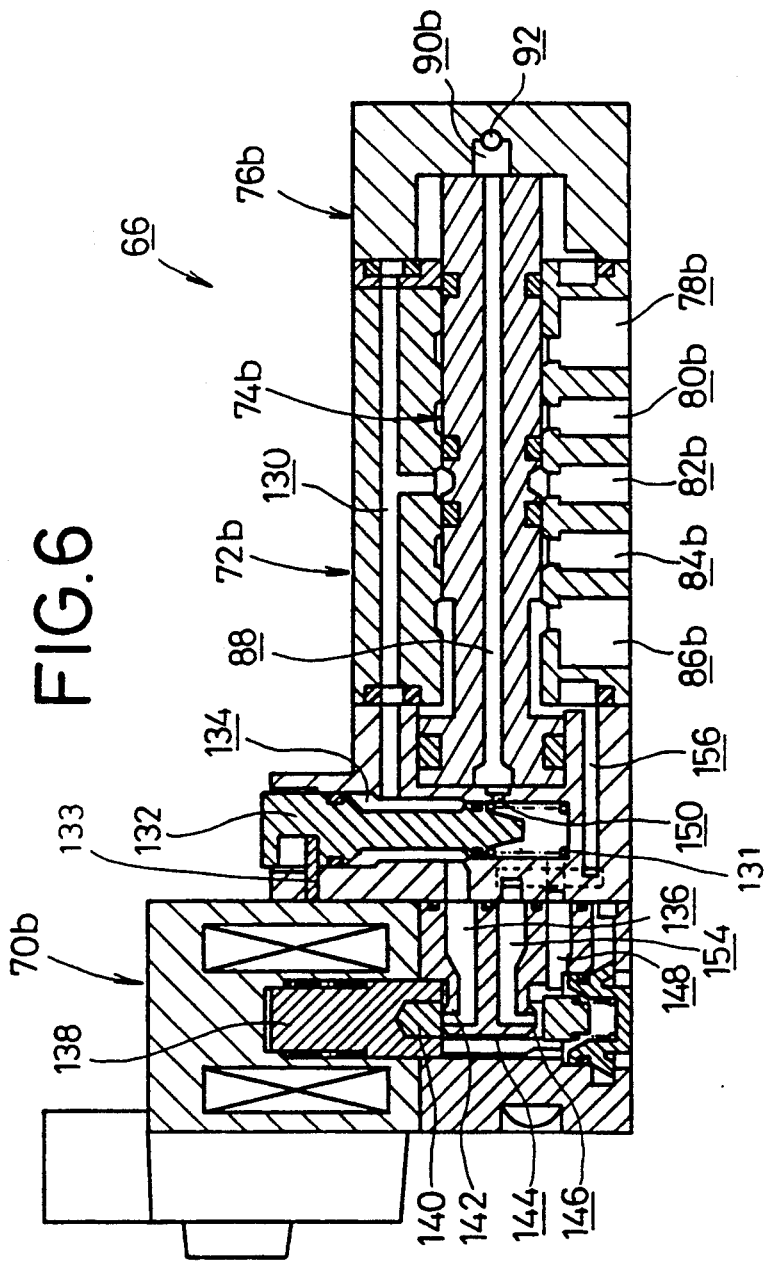
FIG. 6 is a cross-sectional view showing a second solenoid-controlled pilot valve of the vacuum feeding apparatus, which has been closed.

As shown in FIG. 6, the second solenoid-controlled pilot valve 66 is basically constructed in a manner similar to the first solenoid-controlled pilot valve 64. However, a second port 80b and a fourth port 84b are closed because a main body 74b of the second solenoid-controlled pilot valve 66 is fixed. The main body 74b has a through hole 88 centrally defined therein.

Pilot chambers 90a, 90b defined in the end plates 76a, 76b of the first and second solenoid-controlled pilot valves 64, 66, communicate with each other by a hole 92.

Figure 7:
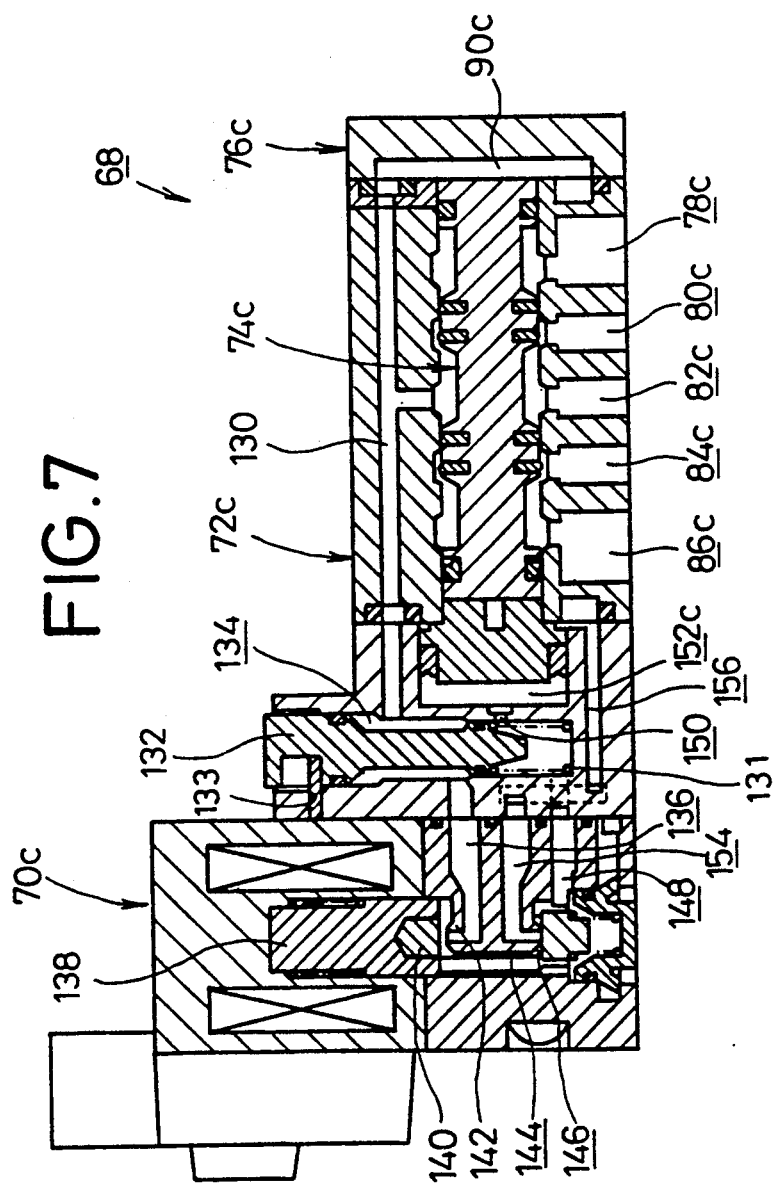
FIG. 7 is a cross-sectional view depicting a third solenoid-controlled pilot valve of the vacuum feeding apparatus, which has been opened.

As illustrated in FIG. 7, the third solenoid-controlled pilot valve 68 is basically constructed substantially in a manner similar to the first solenoid-controlled pilot valve 64. However, they differ from each other in that a main body 74c of the third solenoid-controlled pilot valve 68 and an end plate 76c are different in shape from those of the first solenoid-controlled pilot valve 64, and a pilot chamber 90c of the end plate 76c communicates with a passage 130 cf a seat portion 72c.

Figure 8:
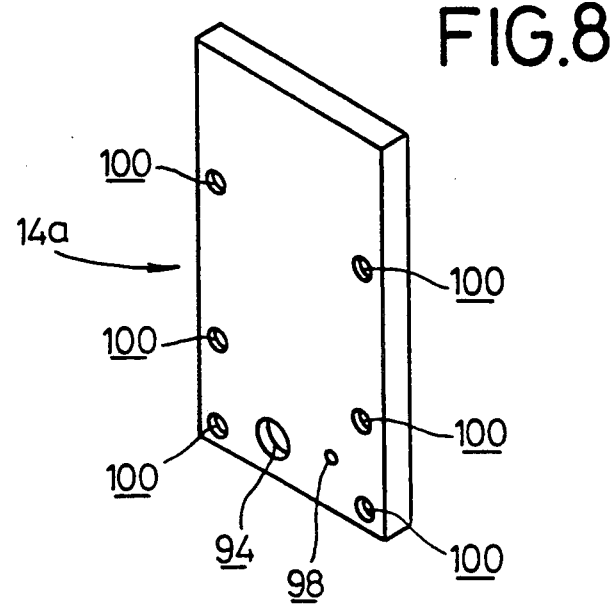
FIG. 8 is a perspective view showing a first connecting plate of the vacuum feeding apparatus according to the present invention.

The flat connecting plate 14a has one side face brought into abutment against the valve mechanism 26 and the other side face brought into abutment against the ejector 16. As shown in FIG. 8, the connecting plate 14a has a first hole 94 defined therein for causing the feed valve 40 and the ejector 16 to communicate with each other, a second hole 98 for causing the vacuum break valve 42 and a vacuum port 96 to be described later to communicate with each other, and six third holes 100 for studs with screws.

As shown in FIG. 2, the ejector 16 is shaped in the form of a rectangle and has in its inner side, a nozzle 102 having a given bore diameter and a diffuser 104 which is provided in continuation with the nozzle 102. The diffuser 104 is communicating with a vacuum generator unit 106. The diffuser 104 communicates with the outside through a silencer 108 comprised of silencer elements formed by filters having activated carbon used to remove odors. The diffuser 104 is shaped in the form of a box whose one side is open. The opening or aperture of the box is blocked or covered with a cover 105 having a plurality of cylindrical slits 103 defined therein at equal intervals.

Figure 9A:
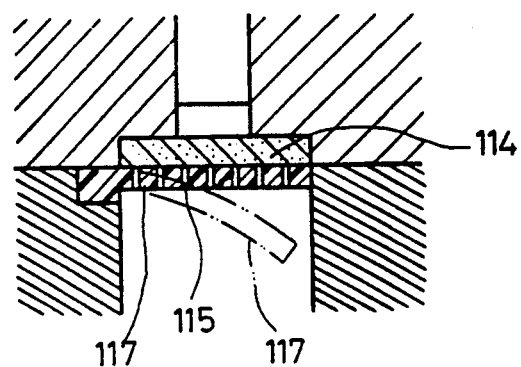
FIGS. 9A and 9B are partially cross-sectional views showing a check valve mounted in a pressure detecting unit.
Figure 9B:
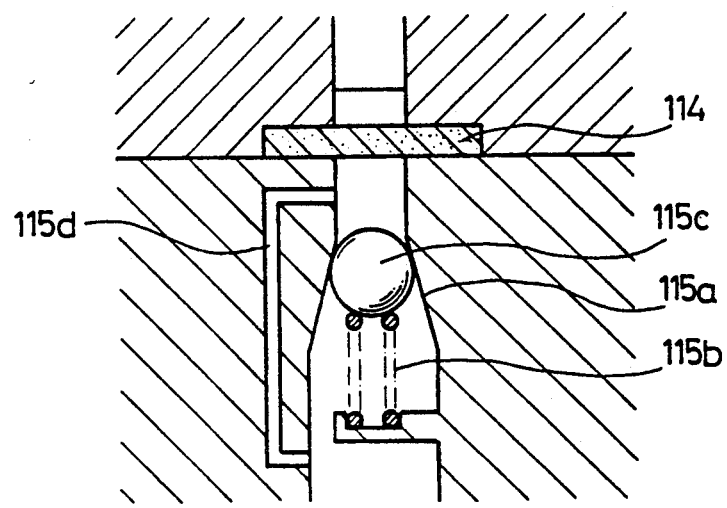

A pressure detecting unit 18 for detecting a vacuum and generating a desired signal based on the vacuum so as to control a working device, and a vacuum port unit 21 are mounted on the ejector 16. The pressure detecting unit 18 is shaped in the form of a box, and has a vacuum switch 110 disposed therein. It is preferable that the vacuum switch 110 is constructed of either a resistance-type semiconductor pressure sensor or a capacity-type semiconductor pressure sensor, which detects a vacuum developed by the vacuum generator unit 106 via a passage 112 which communicates with the vacuum port 96 so as to generate a signal for controlling the working device. A microcomputer such as a one-chip microcomputer mounted on a substrate 19 such as a flexible substrate, which is provided inside the pressure detecting unit 18, is activated to accept an output signal from an electronic pressure sensor, thereby making it possible to provide functions for carrying out a pressure set-up, pressure adjustment, alarm generation/stoppage, ON/OFF operations, hysteresis removal, a change in mode, failure precognition of an internal state monitor of a vacuum generating unit and to control the entire operating state of the vacuum generating unit. The microcomputer may automatically be pre-activated in accordance with a program to automatically set up the ON/OFF operation and to feed back a change in reference pressure detected by another sensor after the microcomputer has been activated, thereby automatically changing preset values to other values. It is also possible to carry out precognitive control of a work attracted state using the fuzzy logic. Further, digital displays such as an unillustrated liquid crystal display (color LCD), an unillustrated light emitting diode (LED), etc. may be provided in connection with the above functions. A filter 114 is placed in the interface between the pressure detecting unit 18 and the vacuum port unit 21. As shown in FIG. 9A, a laminated and flexible check valve 115 is mounted on the filter 114. The check valve 115 has a number of small holes 117 defined therein. FIG. 9B shows another example of the check valve 115. In this example, the check valve 115 has a reduced or scaled-down portion 115a having a passage section is partially reduced in a conical manner. There is also disposed a sphere 115c brought into abutment against the portion 115a by a resilient force of a spring 115b. In addition, the check valve 115 has a small-diameter passage 115d defined therein, which causes upstream and downstream sides of the portion 115a to communicate with each other.

The vacuum port unit 21 is shaped in the form of a rectangle and has a passage 118 which communicates with a check valve 116 formed of a flexible material and the filter unit 20a and which extends from one side face of the vacuum port unit 21 on the ejector 16 side, and the vacuum port 96 formed in the other side face thereof. In addition, the vacuum port unit 21 also has a passage 112 defined therein, which directly communicates with the pressure detecting unit 18 through the vacuum port 96.

The filter unit 20a is disposed near the pressure detecting unit 18 and fixed to the pressure detecting unit 18 and the vacuum port unit 21. The filter unit 20a has a filter body 122 blocked or covered with a transparent cover 120. The filter unit 20a has the filter body 122 disposed therein, and is fixedly secured to the vacuum port unit 21 by a control 126 having a stud 124 with thread grooves defined in the leading end thereof. Thus, the filter body 122 can be replaced with another one by spirally turning the control 126.

The filter body 122 and the filter 114 can make use of an oil absorbing element for removing oil introduced from the vacuum port 96, a hydrophobic element for eliminating supplied moisture or water, and an element having water separating functions such as a fluorine contained resin membrane, a hollow yarn, etc. Alternatively, these elements can be used in combination. Thus, valves, vacuum switches, silencers, etc. can be protected from the moisture or water. In addition, a draining means can also be provided to remove the moisture or water. In the drawing, reference numeral 131 indicates a coil spring for upwardly urging a manually-operated control 132 including the valve body 44, whereas reference numeral 133 indicates a stopper for stopping the control 132 from being upwardly moved through a given position or higher. Incidentally, the purpose of the control 132 is as follows. That is, the control 132 is pressed downward with the fingers of an operator to lower the valve body 44 formed integrally therewith, thereby confirming an operated state of the main body 74a which causes a passage 130, a pilot chamber 152a and a hole 134 to communicate with one another.

The operation of the vacuum feeding apparatus 24a constructed as described above will now be described below.

Figure 11:
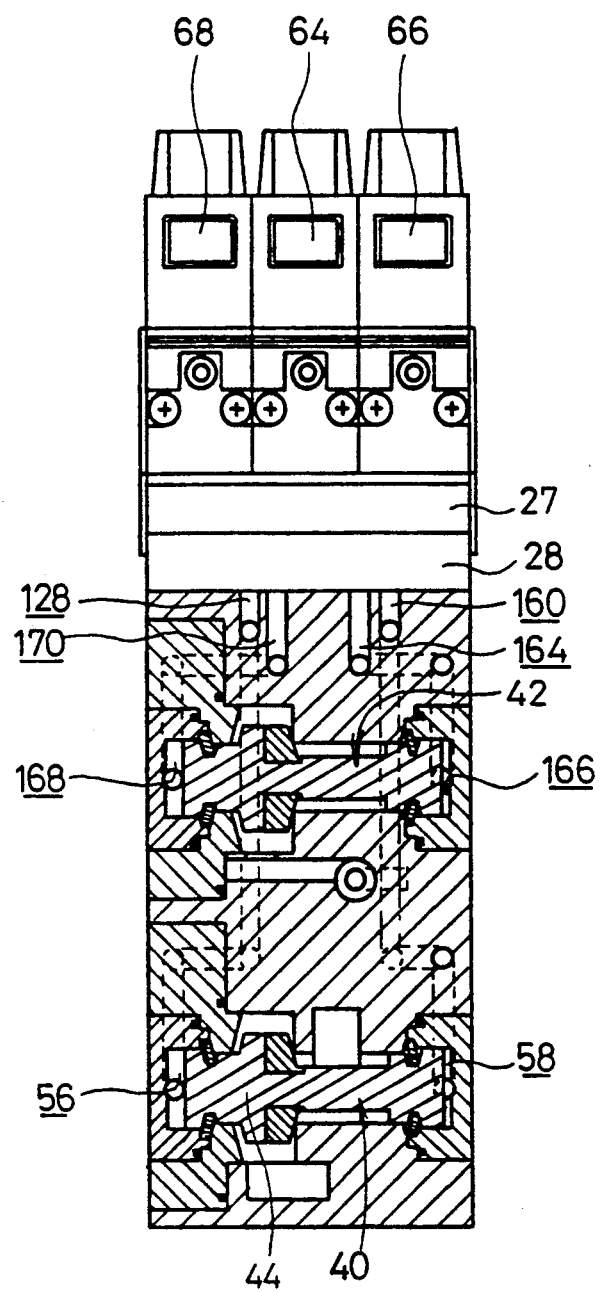
FIG. 11 is a partly cross-sectional view showing a valve unit of the vacuum feeding apparatus.

First of all, an unillustrated compressed-air feed source such as a compressor is energized to cause compressed air to successively pass through the feed port 32 of the valve unit 10a and the inside of the valve mechanism 26 so as to reach the third port 82a of the first solenoid-controlled pilot valve 64. When the solenoid-controlled valve 70a is being de-energized, the third port 82a communicates with the fourth port 84a (see FIG. 10). Thus, the pressurized fluid first passes through the fourth port 84a and then reaches the first pilot chamber 56 of the feed valve 40 via a passage 128, thereby closing the feed valve 40 (see FIG. 11). On the other hand, the pressurized fluid is also delivered to a first passage 136 of the solenoid-controlled valve 70a via the passage 130 and the hole 134 defined around the control 132 from the third port 82a.

When a work is to be attracted by a suction pad and fed toward a desired position, the solenoid-controlled valve 70a is energized. More specifically, a moving iron or element 138 is displaced upward to move a seat member 140 in an upward direction so as to be separated from a valve seat 142. Accordingly, the first passage 136 communicates with a third passage 148 via a passage 144 and a ring-like space 146 (see FIG. 5). As a result, compressed air reaches the third passage 148 and then passes through a lower part of the hole 134 defined around the control 132 and an opening or aperture 150, after which it reaches the pilot chamber 152a, thereby enabling the main body 74a to be moved in the right-hand direction as seen in the drawing (see FIG. 5). At this time, air in the pilot chamber 90b of the end plate 76a reaches the pilot chamber 90b of the second solenoid-controlled pilot valve 66 via the hole 92. Further, the air passes through the through hole 88 of the main body 74b of the second solenoid-controlled pilot valve 66 and the aperture 150 of the control 132 so as to reach a third passage 148 of a solenoid-controlled valve 70b. Thereafter, the air reaches a fifth port 86b via a second passage 154, a passage 156 and a concave-shaped portion, i.e., a recess 158, and then passes through the passage defined in the valve mechanism 26 so as to be discharged into the exhaust port 36 (see FIG. 6).

Thus, the main body 74a of the first solenoid-controlled pilot valve 64 is displaced in the right-hand direction as seen in the drawing. The third port 82a communicates with the second port 80a, whereas the fourth port 84a communicates with the fifth port 86a (see FIG. 5). Accordingly, the pressurized fluid supplied to the third port 82a flows into the second pilot chamber 58 from the second port 80a via a passage 160 so as to displace the feed valve 40 in the left-hand direction as seen in the drawing (see FIG. 11). That is, the valve body 44 is displaced in the left-hand direction to move the third flexible ring 54 away from the valve seat 46 so as to cause the spaces 60, 62 to communicate with each other, thereby enabling the feed valve 40 to be opened (see FIG. 4). At this time, the air in the first pilot chamber 56 is introduced in the fourth port 84a through the passage 128 so as to be discharged into the exhaust port 36 through the fifth port 86a (see FIGS. 5 and 11).

Since the feed valve 40 is opened in this way, the feed port 30 of the valve unit 10a and the ejector 16 communicate with each other so as to supply the compressed air to the ejector 16 (see FIG. 3). Thus, a vacuum is developed in the ejector 16 to open the check valve 116 formed of the flexible material so as to suck or draw air in a suction pad, thereby attracting and holding a desired work. That is, air in the vacuum port 96 side passes through the filter body 122 for removing dust and the passage 118 so as to open the check valve 116. Thereafter, the air passes through the vacuum generator unit 106 so as to be drawn by the diffuser 104.

At this time, the vacuum switch 110 of the pressure detecting unit 18 measures a vacuum developed in the vacuum port 96 through the passage 112 extending from the vacuum port 96 and communicating with the pressure detecting unit 18 so as to produce an output signal from the vacuum, thereby controlling a working device based on the signal.

On the other hand, the air sucked into the diffuser 104 from the vacuum port 96 and the compressed air injected or exhausted from the nozzle 102 are discharged via the silencer 108 into the outside from the diffuser 104 (see FIG. 2).

Figure 12:
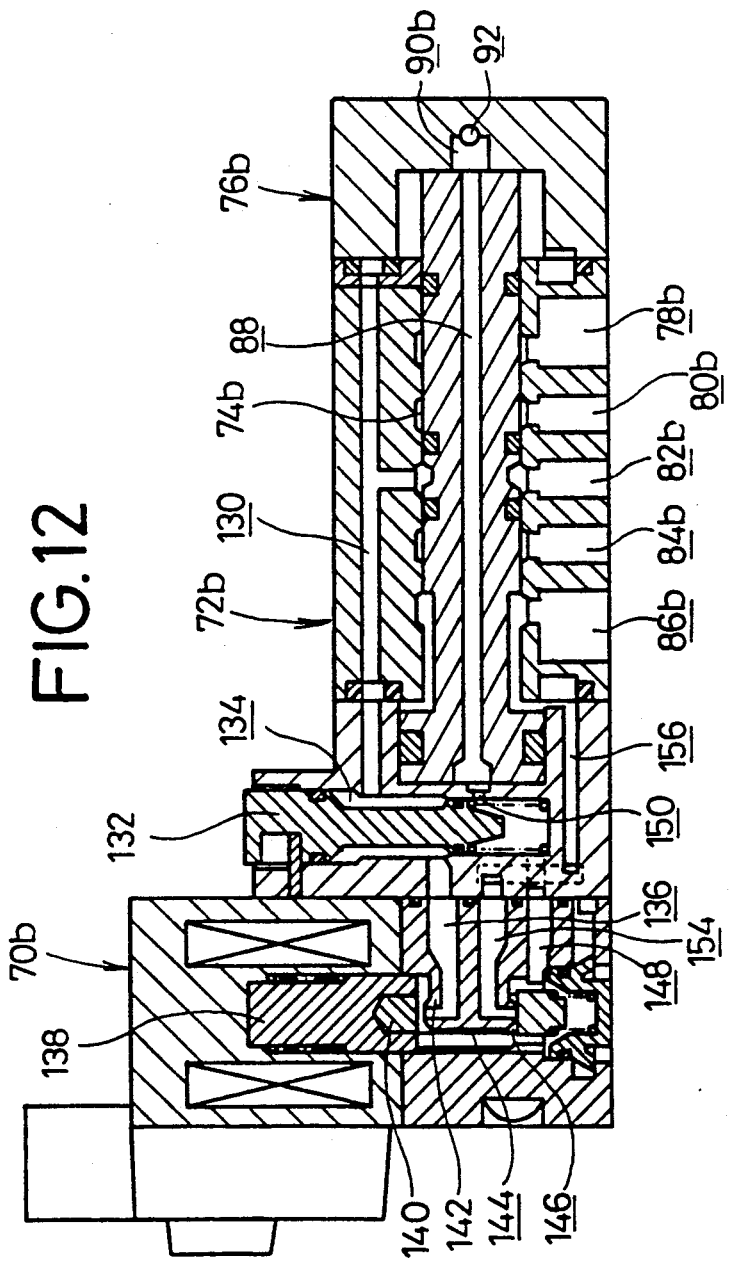
FIG. 12 is a cross-sectional view showing the second solenoid-controlled pilot valve of the vacuum feeding apparatus, which has been opened.
Figure 13:
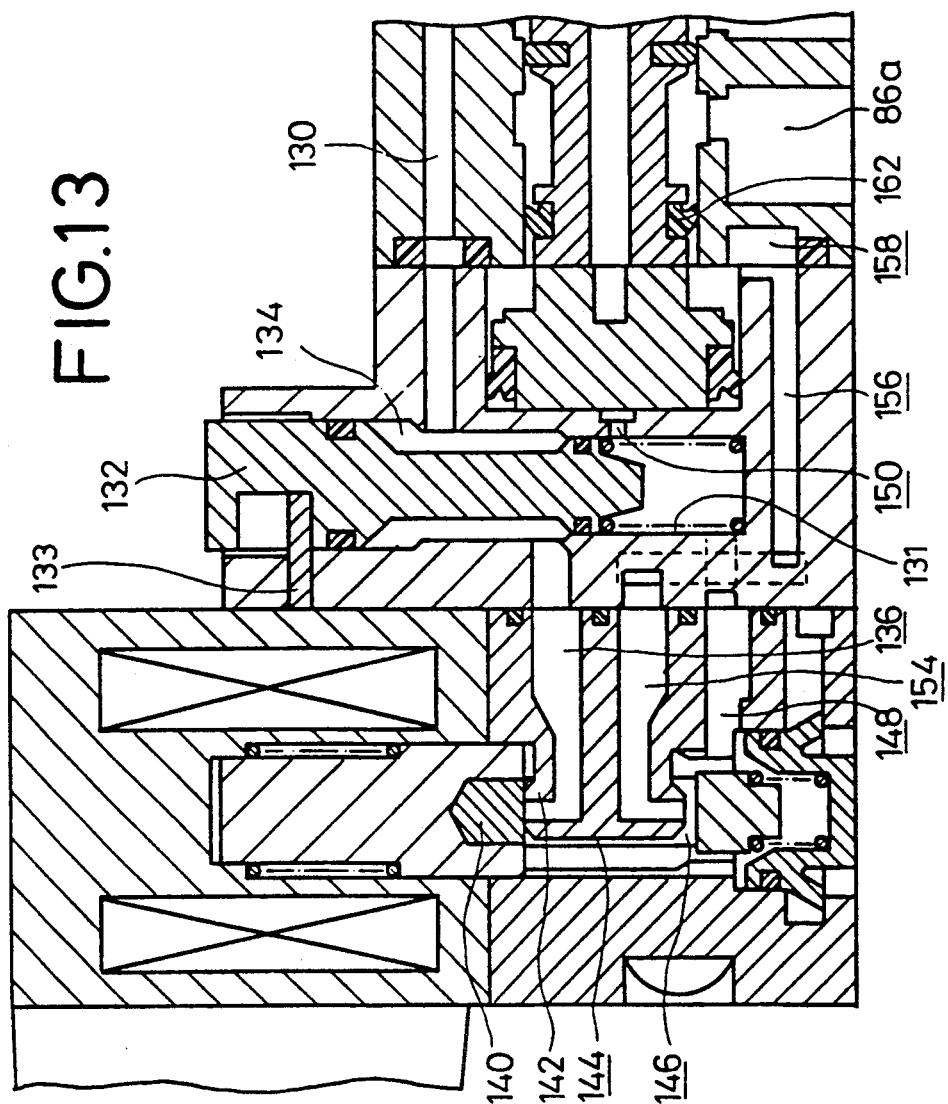
FIG. 13 is a partly enlarged cross-sectional view illustrating the first solenoid-controlled pilot valve of the vacuum feeding apparatus, which has been closed.

Then, a process for separating the work from the suction pad after the work has been fed is carried out in the following manner. More specifically, the solenoid-controlled valve 70a of the first solenoid-controlled pilot valve 64 is de-energized and the solenoid-controlled valve 70b of the second solenoid-controlled pilot valve 66 and a solenoid-controlled valve 70c of the third solenoid-controlled pilot valve 68 are energized. When the solenoid-controlled valve 70a of the first solenoid-controlled pilot valve 64 is de-energized, the moving iron 138 is displaced downward. Thus, the seat member 140 disposed in the upper position is brought into abutment against the seat 142, so that the second passage 154 communicates with the third passage 148 (see FIG. 10). On the other hand, when the solenoid-controlled valve 70b of the second solenoid-controlled pilot valve 66 is energized, the compressed air, which has flowed into a first passage 136 of the solenoid-controlled valve 70b from a third port 82b of a seat portion 72b through a passage 130 and a hole 134, reaches a third passage 148 in the same manner as the solenoid-controlled valve 70a (see FIG. 12). Further, the compressed air flows through an aperture 150 into the through hole 88 of the main body 74b, and reaches the pilot chamber 90a of the end plate 76a of the first solenoid-controlled pilot valve 64 via the hole 92 from the pilot chamber 90b of the end plate 76b, thereby displacing the main body 74a of the first solenoid-controlled pilot valve 64 in the left-hand direction as seen in the drawing (see FIG. 10). Then, the air (see FIG. 5) in the pilot chamber 152a of the first solenoid-controlled pilot valve 64 flows through the aperture 150 into the third passage 148 of the solenoid-controlled valve 70a in accordance with the displacement referred to above. Since the third passage 148 and the second passage 154 communicates with each other, the air passes through the second passage 154 and the passage 156 in that order so as to reach the recess 158. The air, which has reached the recess 158 in this way, displaces the main body 74a in the left-hand direction, and is discharged into the exhaust port 36 of the valve unit 10a from the fifth port 86a through a check seal 162 of the main body 74a (see FIG. 13).

Thus, the main body 74a of the first solenoid-controlled pilot valve 64 is displaced in the left-hand direction as seen in the drawing to cause the third port 82a and the fourth port 84a to communicate with each other and to allow the second port 80a to communicate with the first port 78a (see FIG. 10). Accordingly, the pressurized fluid supplied to the third port 82a flows into the first pilot chamber 56 from the fourth port 84a via the passage 128, thereby closing the feed valve 40 (see FIG. 11). At this time, the air in the second pilot chamber 58 flows through the passage 160 into the second port 80a. Further, the air reaches the exhaust port 36 of the valve unit 10a through the first port 78a so as to be discharged therefrom. Thus, the compressed air is no longer supplied to the ejector 16 and no vacuum is supplied to the suction pad (see FIG. 3).

When the solenoid-controlled valve 70c of the third solenoid-controlled pilot valve 68 is energized, the compressed air, which has flowed into a first passage 136 of the solenoid-controlled valve 70c from a third port 82c of a seat portion 72c through a passage 130, reaches a third passage 148 in a manner similar to the first solenoid-controlled valve 70a (see FIG. 7). Further, the compressed air flows through an aperture 150 of a control 132 into a pilot chamber 152c. On the other hand, the compressed air supplied from the third port 82c reaches a pilot chamber 90c of the end plate 76c through a passage 130. The compressed air, which has reached both ends of the main body 74c in the above-described manner, differs in pressing force from each other due to a difference (the area on the control 132 side > the area on the end plate 76c side) between areas of both ends thereof which are subjected to the compressed air, thereby displacing the main body 74c of the third solenoid-controlled pilot valve 68 in the right-hand direction as seen in the drawing (see FIG. 7).

Thus, the main body 74c of the third solenoid-controlled pilot valve 68 is displaced in the right-hand direction as seen in the drawing to cause the third port 82c to communicate with a second port 80c and to allow a fourth port 84c to communicate with a fifth port 86c. Accordingly, pressurized fluid supplied to the third port 82c flows into a second pilot chamber 166 from the second port 80c via a passage 164 so as to open the vacuum break valve 42 (see FIG. 11). At this time, the pressurized fluid of a first pilot chamber 168 flows into the fourth port 84c through a passage 170 and then reaches the exhaust port 36 through the fifth port 86c so as to be discharge therefrom. Accordingly, the compressed air flows into the vacuum port 96 from the vacuum break port 34 of the valve unit 10a through the vacuum break valve 42, thereby immediately releasing the suction pad from being subjected to the vacuum so as to separate the work from the suction pad (see FIG. 3).

Figure 14:
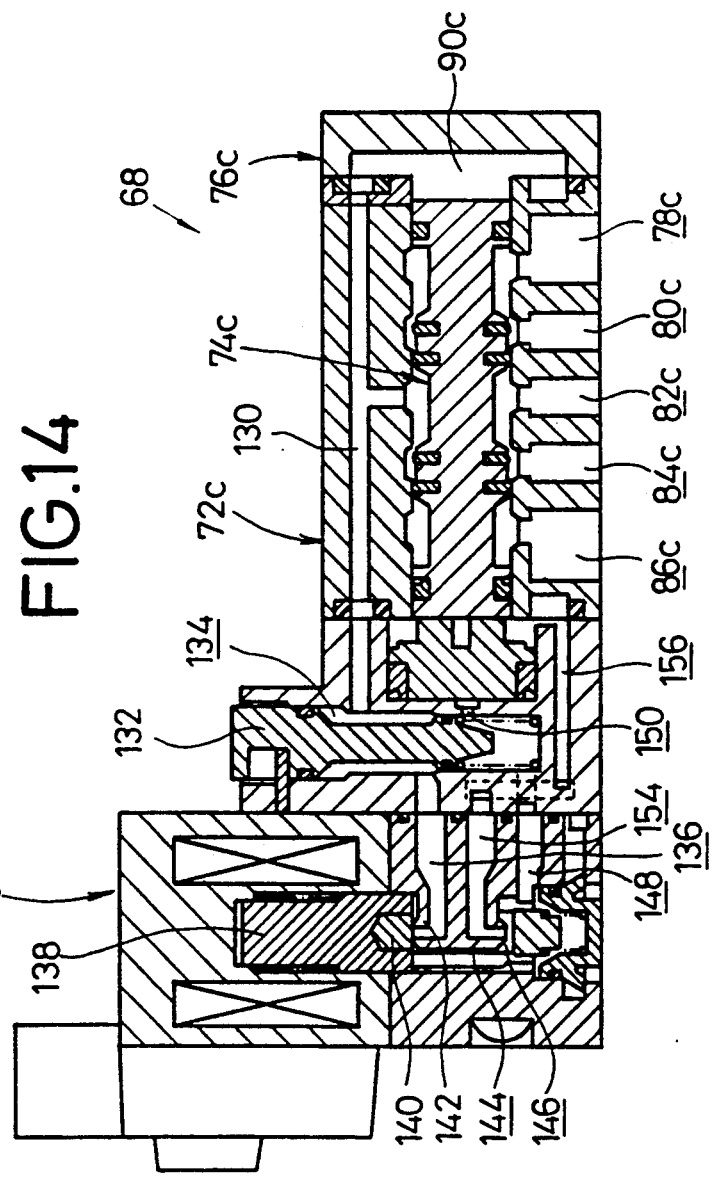
FIG. 14 is a cross-sectional view showing the third solenoid-controlled pilot valve of the vacuum feeding apparatus, which has been closed.

The solenoid-controlled valve 70c of the third solenoid-controlled pilot valve 68 is de-energized during a period in which the work is attracted again by the suction pad after the work has been separated from the suction pad. Similarly to the solenoid-controlled valve 70a, a moving iron 138 of the solenoid-controlled valve 70c is moved downward. Thus, a seat member 140 disposed in an upper position is brought into abutment against a valve seat 142 so as to cut off or block a first passage 136 and a third passage 148 (see FIG. 14). Since a packing 172 disposed in a lower position is also displaced downward, a second passage 154 communicates with the third passage 148. Accordingly, the compressed air is not supplied via an aperture 150 to a pilot chamber 152 from the third passage 148. In addition, the main body 74c is displaced in the left-hand direction as seen in the drawing due to the compressed air which flows into a pilot chamber 90c of an end plate 76c from a third port 82c of a seat portion 72c via a passage 130 (see FIG. 14).

Thus, the main body 74c of the third solenoid-controlled pilot valve 68 is displaced in the left-hand direction as seen in the drawing to cause the third port 82c to communicate with a fourth port 84c and to cause a second port 80c to communicate with a first port 78c. Accordingly, pressurized fluid supplied to the third port 82c flows into the first pilot chamber 168 of the vacuum break valve 42 from the fourth port 84c through the passage 170 to displace the main body 74c in the right-hand direction, thereby closing the vacuum break valve 42 (see FIG. 11). At this time, air in the second pilot chamber 166 reaches the second port 80c through the passage 164 and then reaches the exhaust port 36 through the first port 78c so as to be discharged therefrom. Accordingly, the pressurized fluid does not flow into the vacuum port 96 from the vacuum break port 34 of the valve unit 10a because the vacuum break valve 42 has been closed (see FIG. 3). It is thus possible to prevent the compressed air from being wasted during a period in which a work is attracted by a suction pad again after the work has been separated from the suction pad, for example.

In addition, the first solenoid-controlled pilot valve 64 and the second solenoid-controlled pilot valve 66 are allowed to communicate with each other by the end plate 76a and are of double solenoid types. Therefore, the main body 74a is not changed over to another even in the event of a power failure. Even when the power failure occurs while a work is being attracted by a suction pad and fed under suction, there is no possibility of release of the work from being attracted by the suction pad and a fall of the work from the suction pad.

A description will now be made of a vacuum pump type vacuum feeding apparatus 24b as a second embodiment. Incidentally, the same elements of structure as those employed in the first embodiment are identified by like reference numerals, and their detailed description will therefore be omitted.

Figure 15:
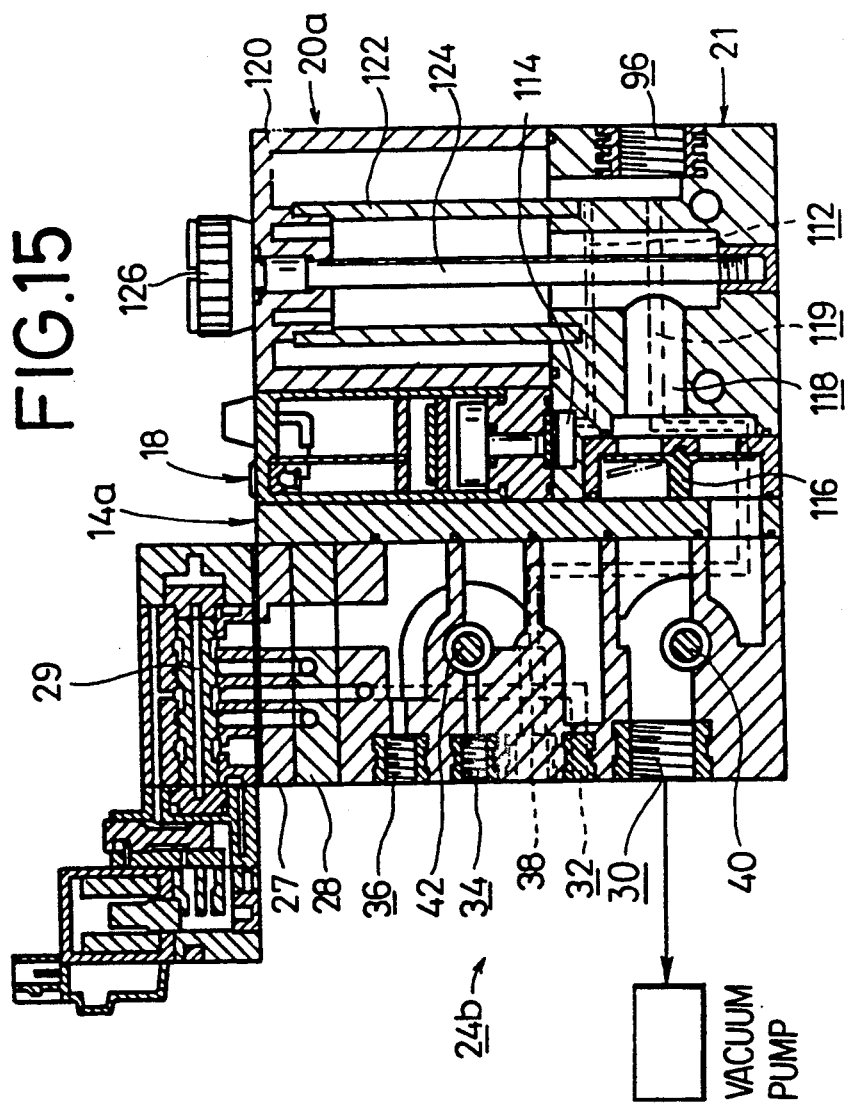
FIG. 15 is a cross-sectional view illustrating a vacuum feeding apparatus with a vacuum pump externally incorporated therein according to a second embodiment of the present invention.
Figure 16:
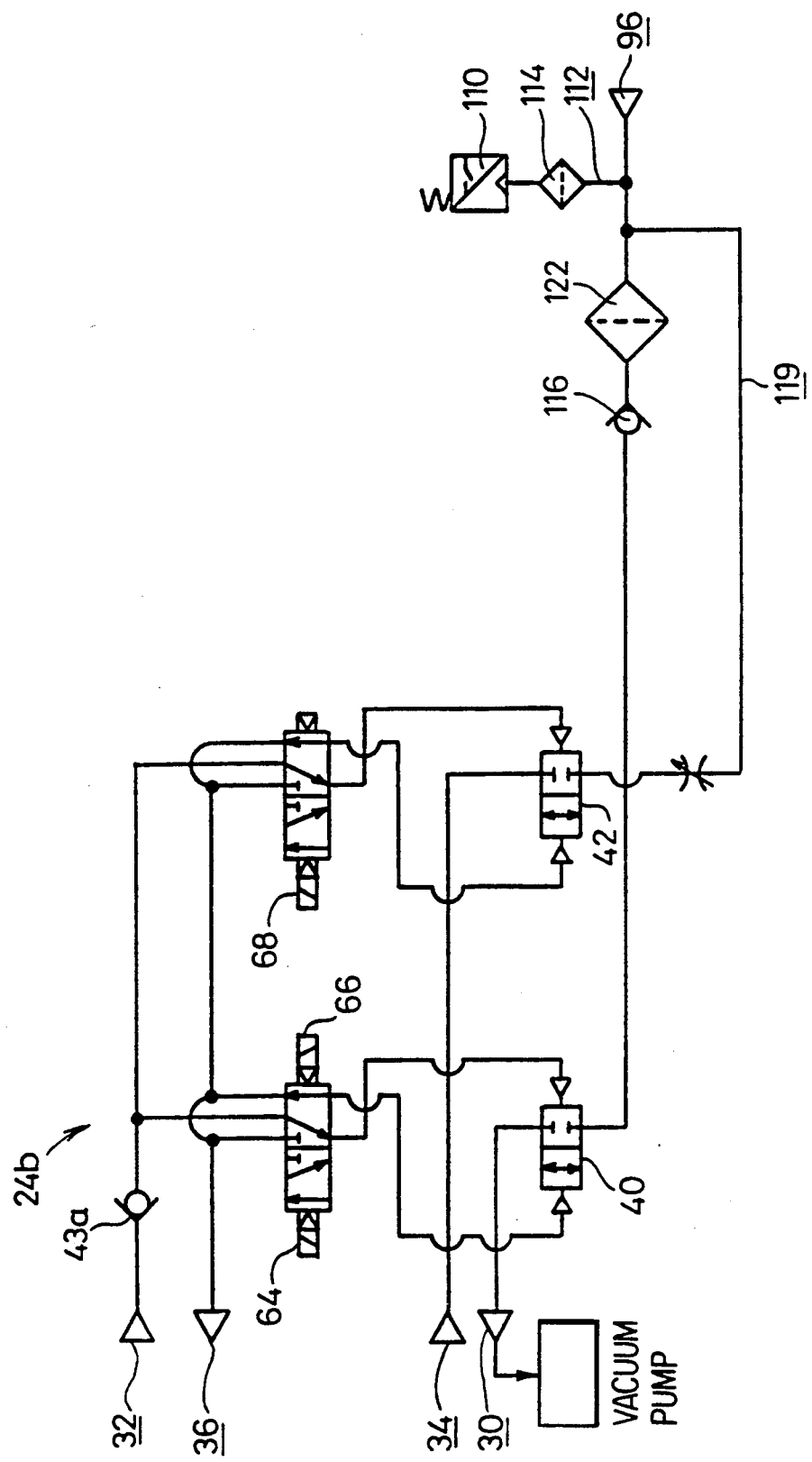
FIG. 16 is a view for describing a fluid circuit of the vacuum feeding apparatus shown in FIG. 15.

The vacuum feeding apparatus 24a with the ejector incorporated therein can easily be replaced with the vacuum feeding apparatus 24b with the vacuum pump mounted thereon. That is, the vacuum feeding apparatus 24b is constructed by coupling a vacuum pump as an alternative to the ejector 16 removed from the vacuum feeding apparatus 24a to a feed port 30 of a valve unit 10a (see FIGS. 15 and 16).

The vacuum feeding apparatus 24b is also activated in a manner similar to the vacuum feeding apparatus 24a. That is, pressurized fluid supplied from a feed port 32 for a pilot valve flows into a first solenoid-controlled pilot valve 64 to open a feed valve 40. Thus, the vacuum pump and a vacuum port 96 communicate with each other to supply a vacuum to a working device such as a suction pad, thereby attracting a desired work. Then, introduced air passes through a filter body 122, a passage 118 and a check valve 116 and flows into the vacuum pump from the feed port 30 (see FIG. 16). Other operations of the vacuum feeding apparatus 24b are exactly the same as those of the vacuum feeding apparatus 24a.

The vacuum feeding apparatuses 24a, 24b constructed as described above are respectively often used in continuation in plural form by using corresponding manifolds. Then, manifold-correspondence type vacuum feeding apparatuses 24c, 24d, which make use of an ejector and a vacuum pump respectively, will be described as third and fourth embodiments respectively.

Figure 19:
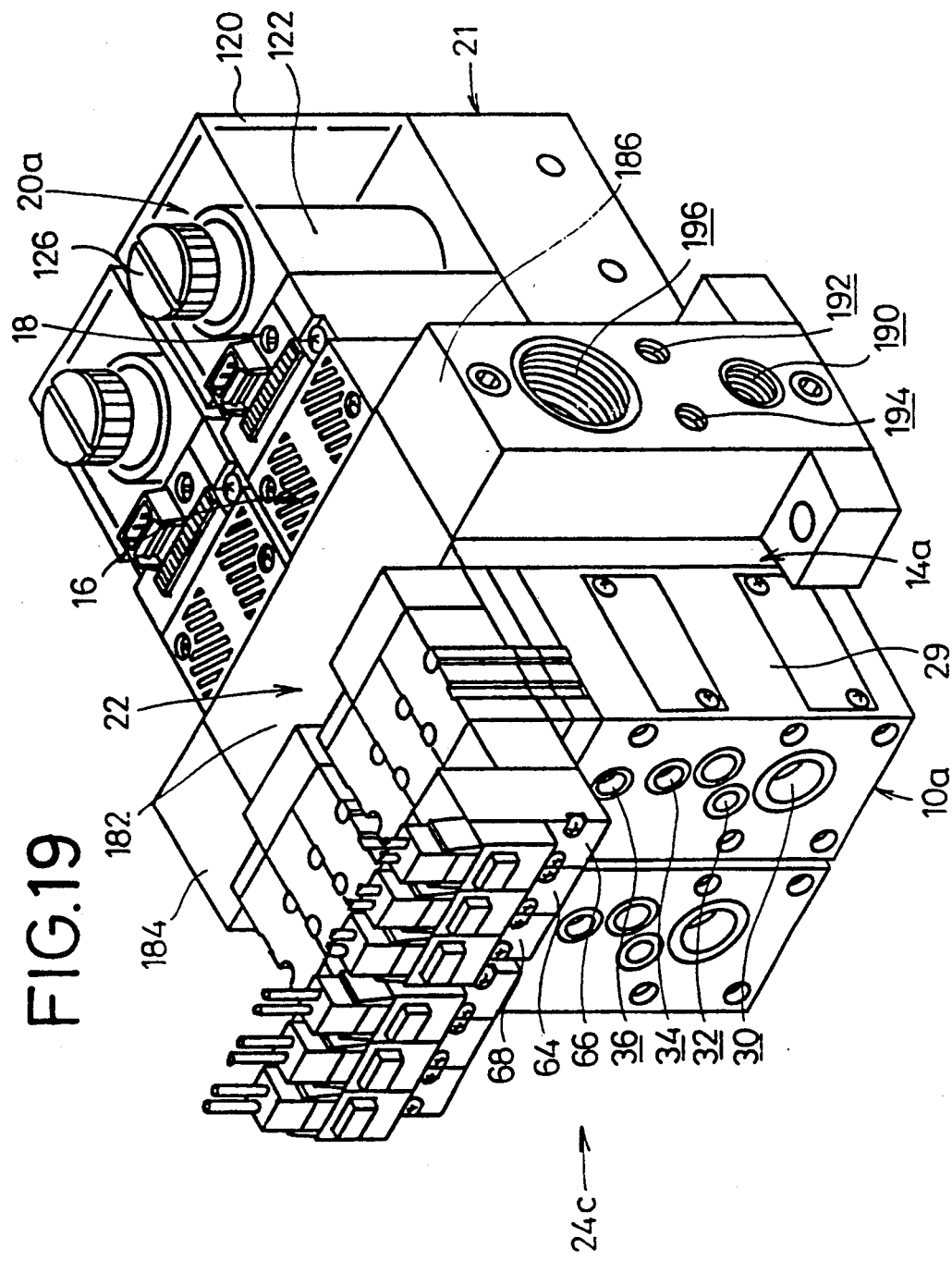
FIG. 19 is a perspective view showing a manifold correspondence-type vacuum feeding apparatus with an ejector incorporated therein according to a third embodiment of the present invention.

A manifold 22 has a cross-section substantially shaped in the form of a rectangle, and basically comprises a manifold base 182, and a pair of end plates 184, 186 respectively mounted on both ends of the manifold base 182, which correspond to the front and back faces thereof (see FIG. 19).

Figure 17:
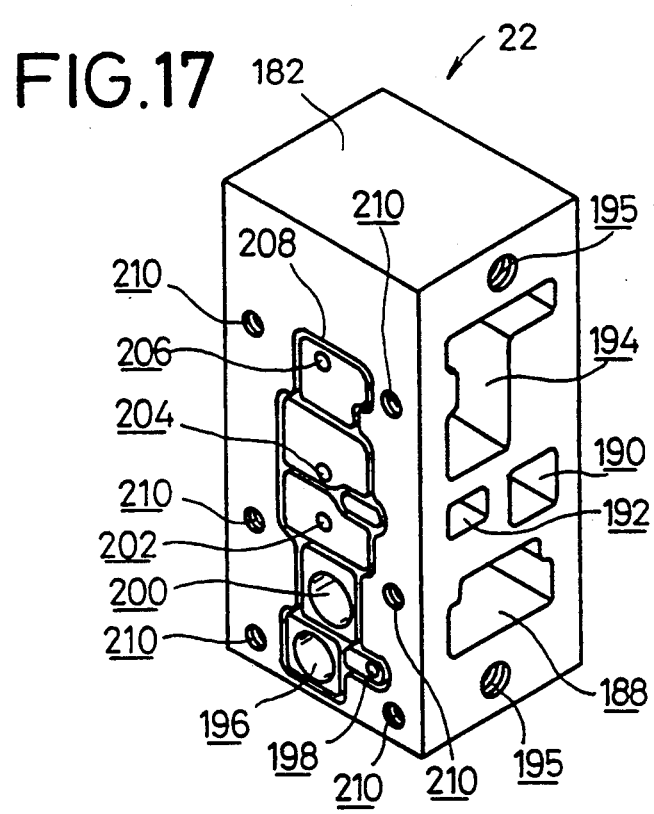
FIG. 17 is a perspective view showing a manifold of the vacuum feeding apparatus according to the present invention.
Figure 18:
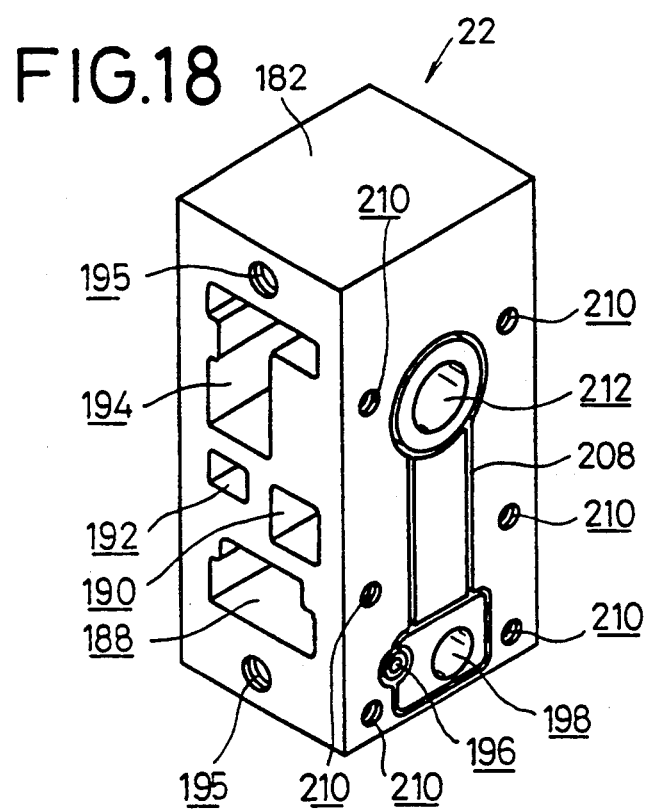
FIG. 18 is a perspective view depicting sides opposite to the sides of the same manifold shown in FIG. 17, of the vacuum feeding apparatus according to the present invention.

In this case, the manifold base 182 has a feed passage 188 which extends through both ends thereof on which the end plates 184, 186 are mounted, a feed passage 190 for a pilot valve, a vacuum break passage 192, and a discharge or exhaust passage 194 for a pilot valve, all of which are spaced away from one another at given intervals, as shown in FIGS. 17 and 18.

Figure 20:
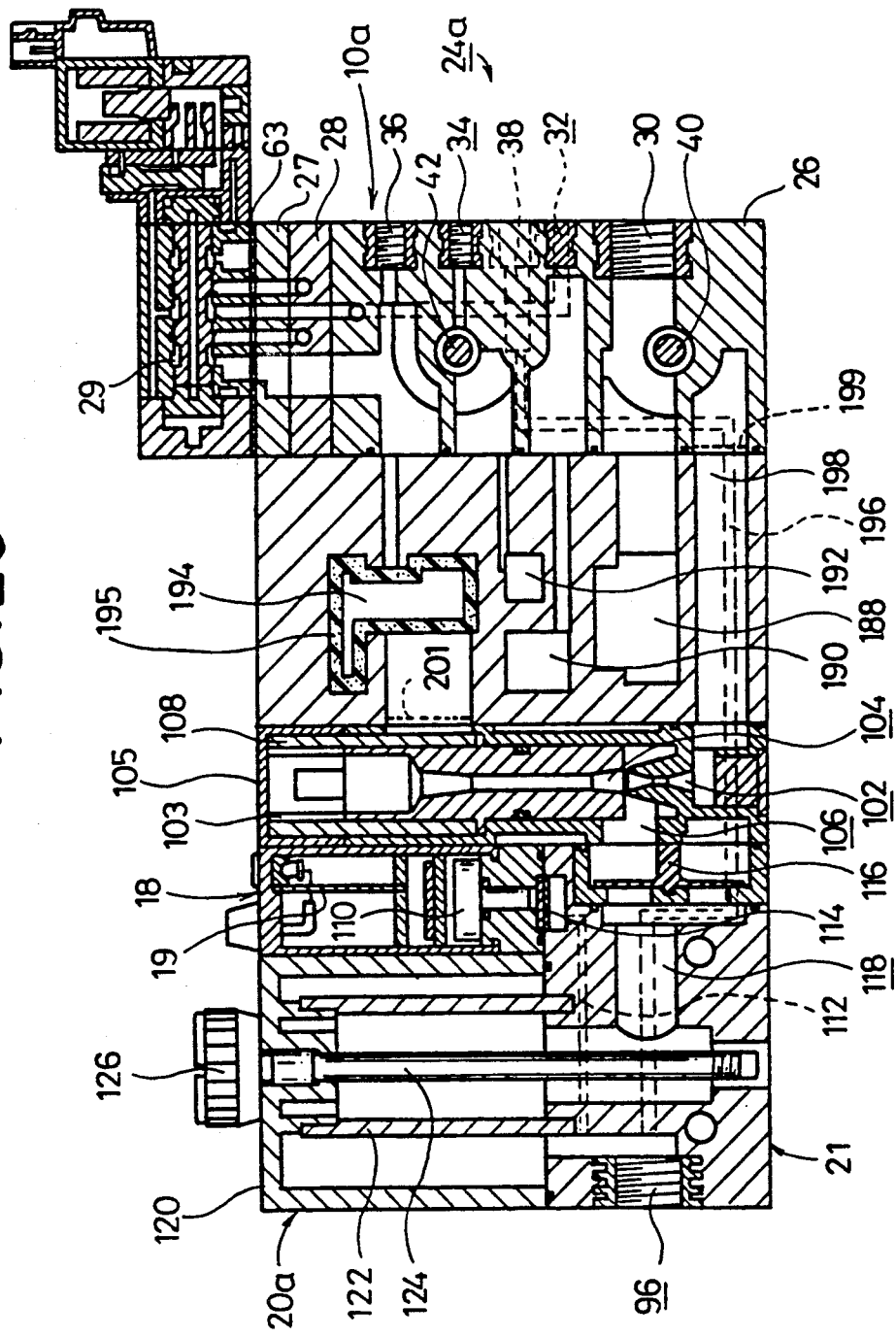
FIG. 20 is a vertical cross-sectional view showing a manifold correspondence-type vacuum feeding apparatus in which a silencing unit is to be incorporated in a manifold.

FIG. 20 is a vertical cross-sectional view showing a combination of a valve mechanism 26, an ejector 16, a vacuum port unit 21 and a manifold 22 The manifold 22 has a feed passage 188, a feed passage 190 for a pilot valve, a vacuum break passage 192, and a discharge or exhaust passage 194 for a pilot valve, all of which are defined therein. In addition, the manifold 22 also has a passage 198 defined therein for causing a feed valve 40 and an ejector 16 to communicate with each other, and a passage 196 defined therein for causing a vacuum break valve 42 and a vacuum port 96 to communicate with each other. It is preferable that a silencer element 195 is mounted on a wall portion of the exhaust passage 194 because a sound silencing effect can be obtained. The silencer element 195 may be either a sound absorbing material or a noise insulating material. It is desired that a check valve 199 is mounted in a passage 198 for causing the feed valve 40 and the ejector 16 to communicate with each other. Alternatively, it is preferable that a flexible and flat check valve 201 be provided between one side face of the ejector 16 and the exhaust passage 194 of the manifold 22.

When the ejector 16 is deactivated, the check valve 199 is subjected to exhaust pressure of another vacuum generating unit through the exhaust passage 194 of the manifold 22 so as to be closed. It is therefore possible to prevent the exhaust of another vacuum generating unit from entering into the ejector out of the exhaust passage. On the other hand, the check valve 201 prevents remaining intake air from flowing into an air feed valve out of the vacuum port via the ejector. It is therefore possible to avoid deterioration in performance and durability of the air feed valve, which occur due to dirt or fouled intake air. Incidentally, check valves 197a, 197b are mounted on the end plates 184, 186, respectively, of the feed passage 190. The check valves 197a, 197b are used to make longer the time required to retain pressure applied to the valve body when the supply of compressed air is stopped (see FIG. 22).

Female threads 195 for fixing the end plates 184, 186 are disposed above the exhaust passage 194 and below the feed passage 188 on both ends sides respectively.

One of the side faces of the manifold 22 is brought into abutment against one side face of a connecting plate 14b, whereas the other thereof is brought into abutment against one side face of the ejector 16 when the vacuum feeding apparatus 24a with the ejector incorporated therein is used. In addition, the other thereof is brought into abutment with the vacuum port unit 21 when the vacuum feeding apparatus 24b with the vacuum pump mounted thereon is used.

As shown in FIG. 17, first through sixth communication holes 196, 198, 200, 202, 204, 206 are defined, at given intervals, in one of the side faces of the manifold 22 brought into abutment against the connecting plate 14b. A packing groove 208 is engraved around these communications holes, and a packing is mounted in the packing groove 208. The manifold 22 additionally has internally-threaded bores 210 used to fix an external device.

The third through sixth communication holes 200, 202, 204, 206 communicate with the feed passage 188, the feed passage 190, the vacuum break passage 192 and the exhaust passage 194, respectively. In addition, the first and second communication holes 196, 198 extend through the side face of the manifold 22 on the other end side thereof.

As shown in FIG. 18, a seventh communication hole 212 is defined above in one of the side faces of the manifold 22 which is brought into abutment against the ejector 16, and first and second communication holes 196, 198 extending from the side face of the manifold 22 on the connecting plate 14b side are defined below in an opened state. In addition, a packing groove 208 is defined around the first and second communication holes 196, 198. A plurality of internally-threaded bores 210 for fixing an external device are also defined in the side face of the manifold 22.

Figure 21:
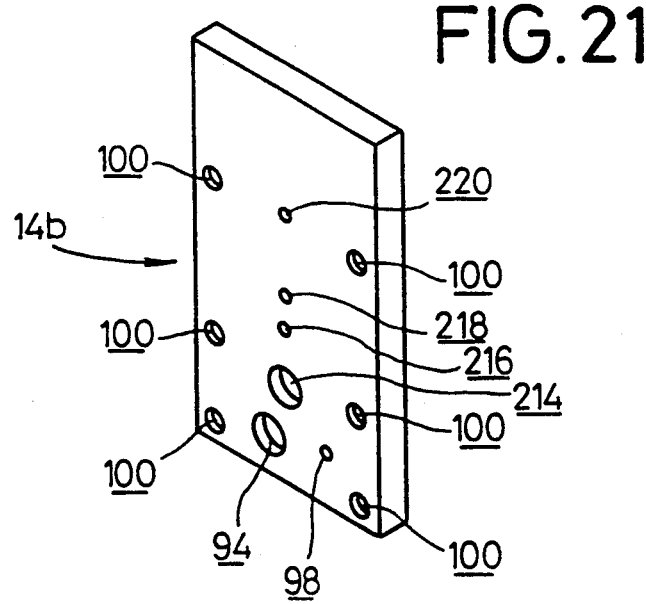
FIG. 21 is a perspective view illustrating a second connecting plate of the vacuum feeding apparatus according to the present invention.

As shown in FIG. 21, the connecting plate 14b has first through third holes 94, 98, 100 defined therein, and fourth through seventh holes 214, 216, 218, 220 defined therein which correspond to the third through sixth communication hole 200, 202, 204, 206 of the manifold 22 in a manner similar to the connecting plate 14a.

Figure 22:
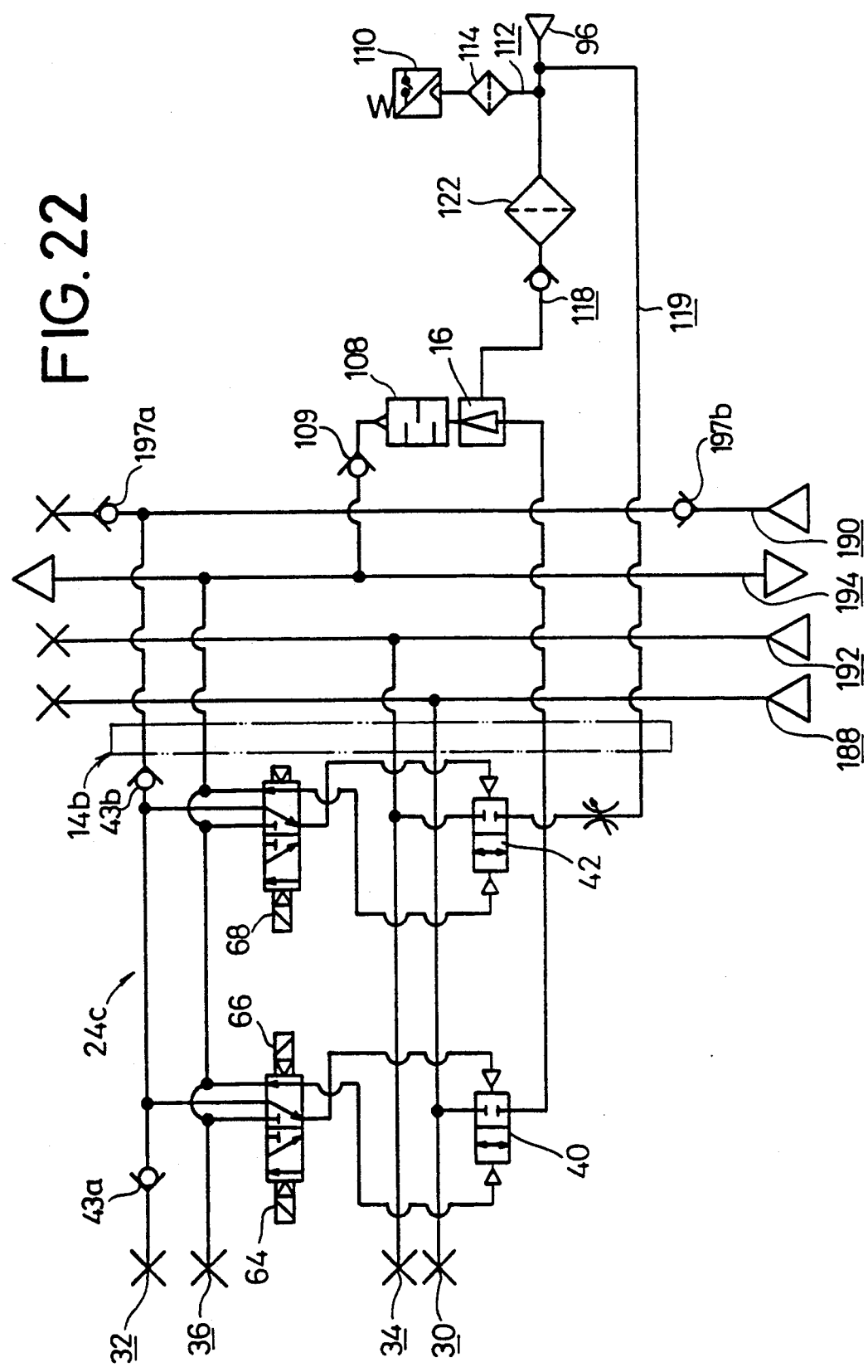
FIG. 22 is a view for describing a fluid circuit of a manifold correspondence-type vacuum feeding apparatus with an ejector incorporated therein according to a fourth embodiment of the present invention.

In the manifold correspondence-type vacuum feeding apparatus 24c, constructed as described above, the unused respective ports 30, 32, 34, 36 of the valve unit 10a are closed or blocked with screws respectively (see FIG. 22). Pressurized fluid or a vacuum flows into the valve unit 10a from the respective passages 188, 190, 192, 194 of the manifold 22 as an alternative to the respective ports 30, 32, 34, 36 through the third through sixth communication holes 200, 202, 204, 206 and the fourth through seventh communication holes 214, 216, 218, 220 of the connecting plate 14b (see FIGS. 17, 21, and 22). The vacuum feeding apparatus 24c with the ejector incorporated therein is constructed such that the exhaust from the ejector 16 flows into the exhaust passage 194 of the manifold 22 via a check valve 109 (see FIG. 22). When the vacuum feeding apparatus 24c with the ejector incorporated therein is provided in continuation in plural form, the check valve 109 serves to prevent the exhaust from a vacuum feeding apparatus 24c while in operation to a de-activated vacuum feeding apparatus 24c from flowing backward and to prevent it from being discharged out of the vacuum port 96. Other operations of the vacuum feeding apparatus 24c, are identical to those of the vacuum feeding apparatuses 24a, 24b.

Figure 23:
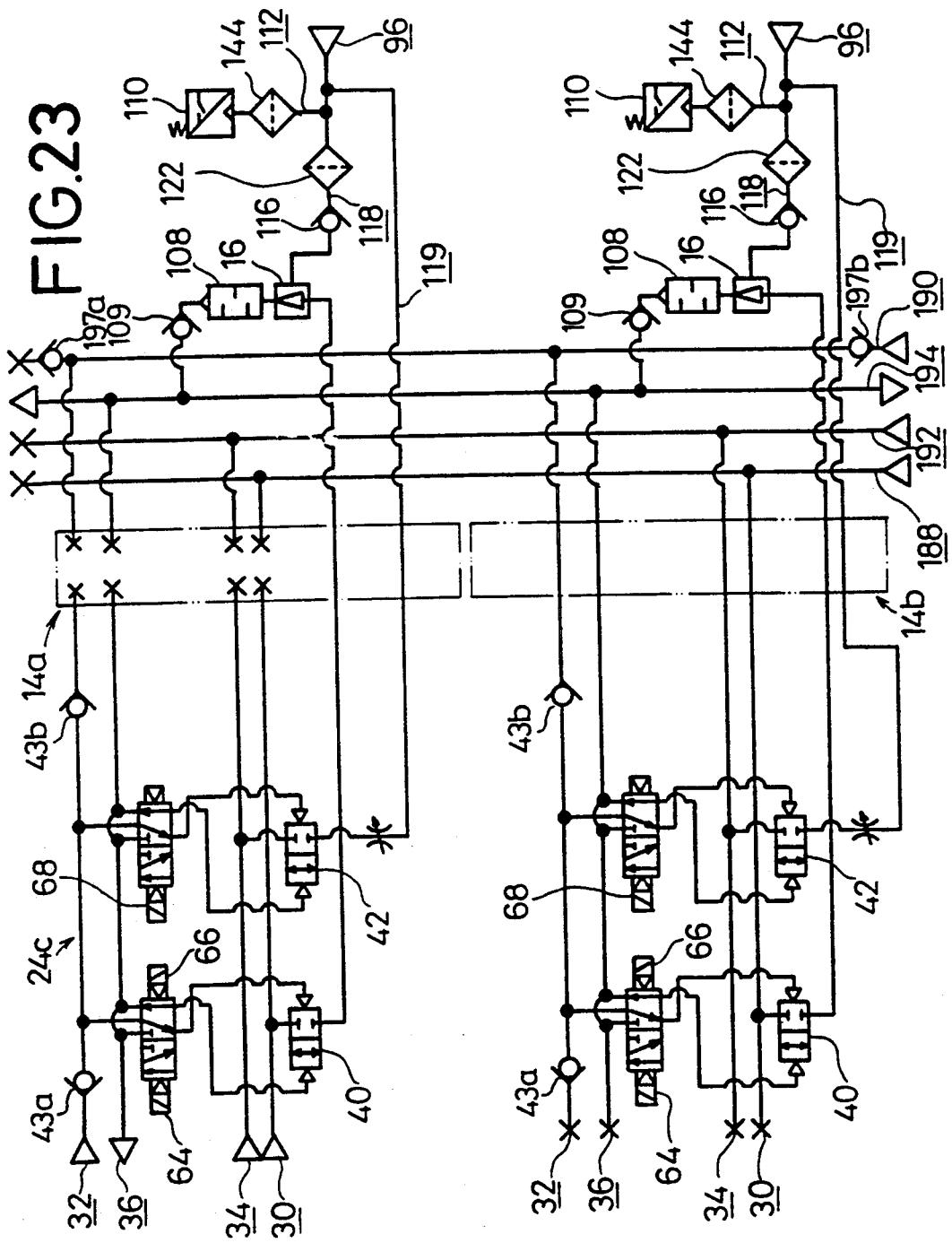
FIG. 23 is a view for describing a fluid circuit of a manifold correspondence-type vacuum feeding apparatus with an ejector incorporated therein according to a fifth embodiment of the present invention.

When the above manifold correspondence-type vacuum feeding apparatus 24c, is provided in continuation in plural form, pressurized fluid such as compressed air or a vacuum is supplied to all the vacuum feeding apparatuses 24 from the manifolds 22. At this time, when a single vacuum feeding apparatus is activated to perform a desired process by making use of the nitrogen through ports 30, 32, 34, 36 of a valve unit 10a, it is necessary to detach the vacuum feeding apparatus from the manifold 22. This is because the compressed air and the nitrogen tend to mix in a state in which the vacuum feeding apparatus 24 using the nitrogen has been mounted on the manifold 22, and a desired purpose cannot be achieved. In this case, the connecting plate 14a (see FIG. 8) employed in a fifth embodiment is used as an alternative to the connecting plate 14b (see FIG. 21). Since the connecting plate 14a has only the first through third holes 94, 98, 100 defined therein, the connecting plate 14a serves to block or cut off a feed passage 188, a feed passage 190 for a pilot valve, a vacuum break passage 192, a discharge or exhaust passage 194 for a pilot valve, of a manifold 22, and a valve unit 10a (see FIG. 23). Thus, a desired vacuum feeding apparatus 24c can be used with pressurized fluid different from that flowing into the manifold 22.

Further, the nitrogen is required to prevent impurities such as dust, etc. from being adhered to a work such an IC substrate under the compressed air when the vacuum break is made, and to avoid the occurrence of its failure. Therefore, the nitrogen may be used only for the vacuum break. This is advantageous from a cost standpoint.

Figure 24:
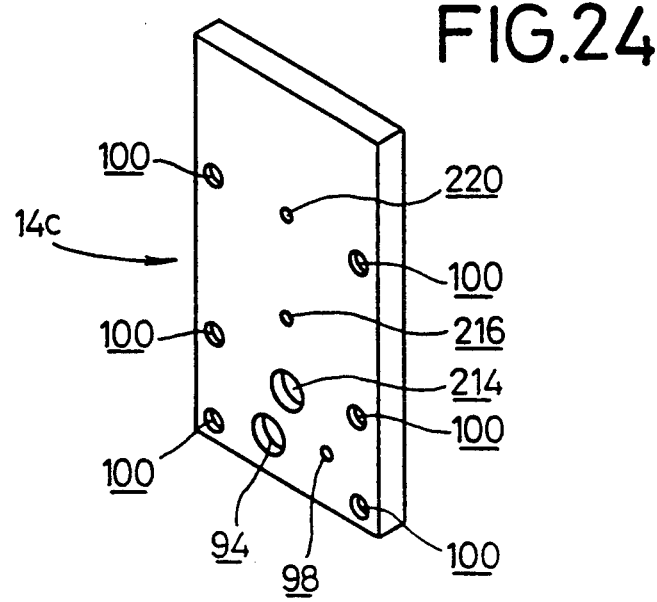
FIG. 24 is a perspective view showing a third connecting plate of the vacuum feeding apparatus according to the present invention.
Figure 25:
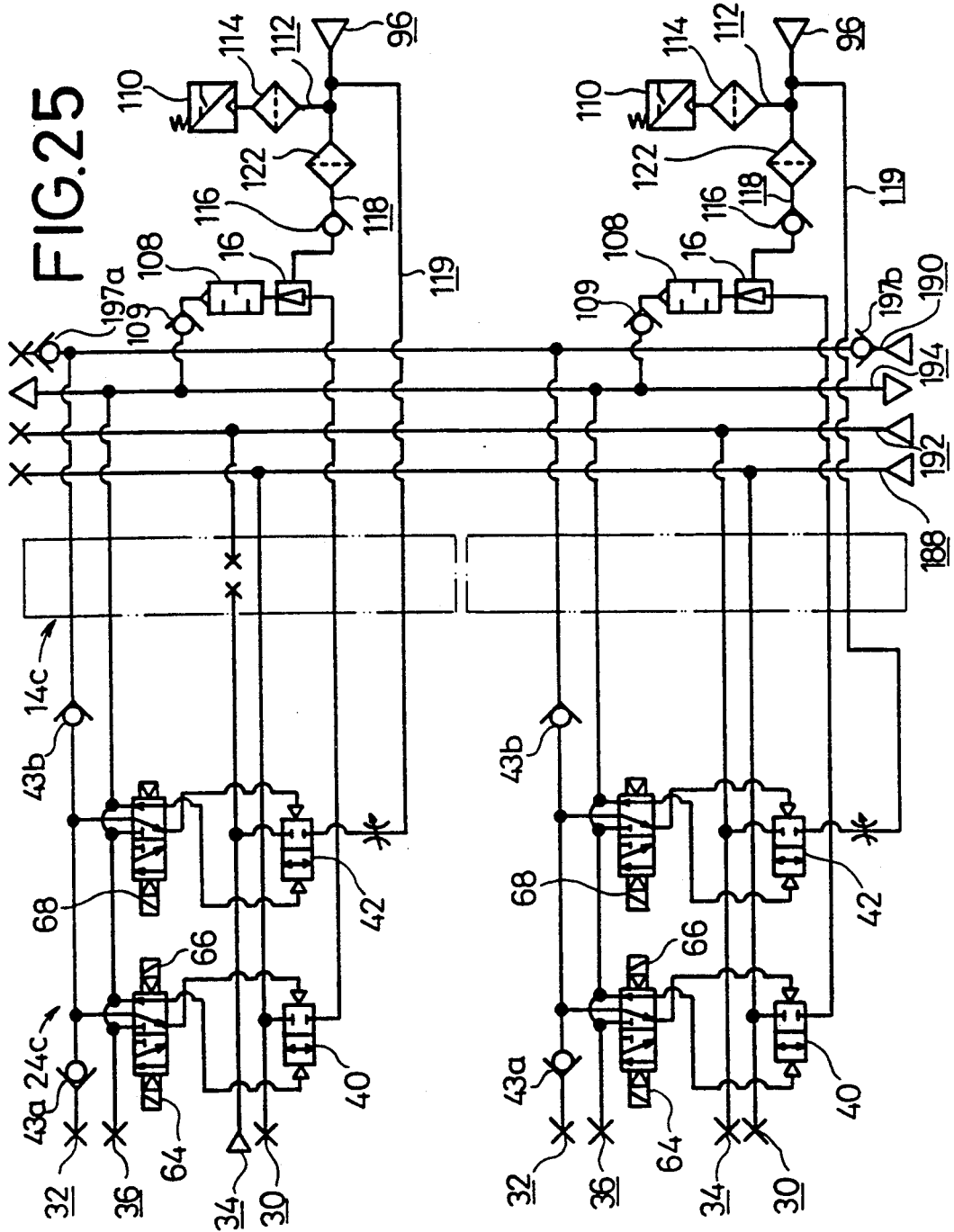
FIG. 25 is a view for describing a fluid circuit of a manifold correspondence-type vacuum feeding apparatus with an ejector incorporated therein according to a sixth embodiment of the present invention.

A description will now be made of a connecting plate 14c employed in a sixth embodiment, which is applied to this case. As illustrated in FIG. 24, the connecting plate 14c is constructed in such a manner as to exclude the sixth hole 218 of the connecting plate 14b. That is, the connecting plate 14c serves to block or cut off a vacuum break passage 192 of a manifold 22 of a vacuum feeding apparatus 24c and a vacuum break valve of a valve unit 10a as illustrated in FIG. 25,. Accordingly, the nitrogen is used through a vacuum break port 34 of the valve unit 10a. On the other hand, other ports 30, 32, 34 are blocked with screws respectively, so that passages 188, 190, 194 of the manifold 22 can be used.

The fifth and sixth embodiments have described the vacuum feeding apparatus 24c with the ejector incorporated therein. It is, however, needless to say that even a vacuum feeding apparatus 24d using a vacuum pump can be operated in the same manner as the vacuum feeding apparatus 24c. The connecting plate is not necessarily limited to the illustrated embodiments, and a suitable connecting plate can be used as needed.

In the vacuum feeding apparatuses 24a through 24c which have been used in the above-described manner, when compressed air is supplied to all of the first through third solenoid-controlled pilot valves 64, 66, 68, the feed valve 40, and the vacuum break valve 42, it is preferable to supply the compressed air only from a single port. This is because a pipe arrangement is simple and efficient. However, the provision of the valve mechanism 26 according to various uses or purposes causes a cost problem by which a user is confronted. Therefore, for example, the function plate 12a is inserted in an interval between the valve mechanism 26 and the connecting plate 14a so as to alter a fluid circuit.

Figure 26:
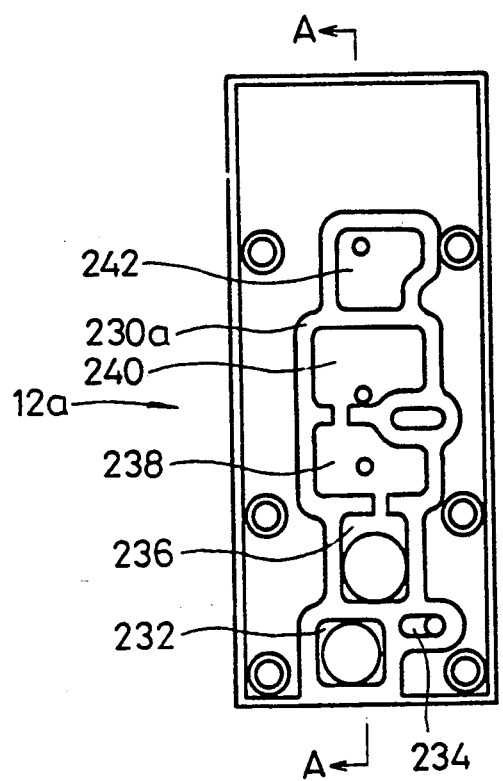
FIG. 26 is a front view showing a first function plate of the vacuum feeding apparatus according to the present invention.
Figure 27:
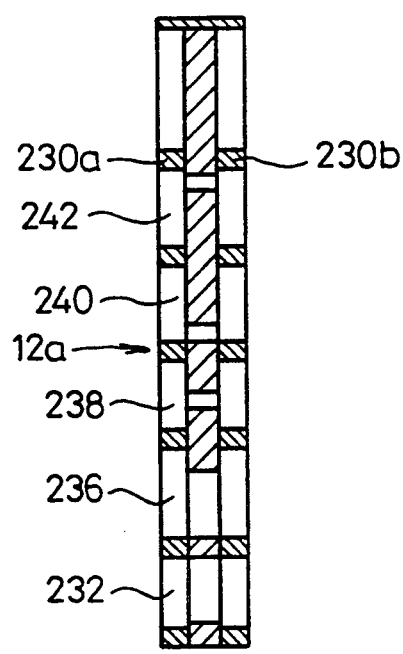
FIG. 27 is a cross-sectional view showing the first function plate of the vacuum feeding apparatus, taken along line A—A of FIG. 26.
Figure 28:
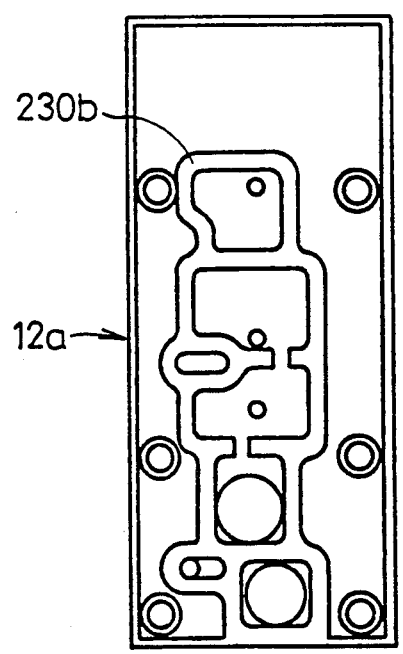
FIG. 28 is a rear view showing the first function plate of the vacuum feeding apparatus according to the present invention.

The plate-like function plate 12a has one side face which is brought into abutment against the valve mechanism 26, and the other side face which is brought into abutment against the connecting plate 14a. FIG. 26 is a front view of the function plate 12a (on the valve unit 10a side). FIG. 27 is a vertical cross-sectional view of the function plate 12a and FIG. 28 is a rear view of the function plate 12a (on a vacuum port unit 21 side)

The function plate 12a has both faces roughly divided into seven spaces or sections by packings 230a, 230b, respectively. The function plate 12a includes six spaces with cavities, of the seven spaces, i.e., first through sixth chambers 232, 234, 236, 238, 240, 242. The packings 230a, 230b prevent fluid from mutually flowing into the respective spaces and also prevent the fluid from leaking out of a gap between the function plate 12a and the other member. In the present embodiment, the packing 230a for separating the third through fifth chambers 236, 238, 240 from one another is partly cut off, and hence the third through fifth chambers 236, 238, 240 communicate with one another (see FIG. 26).

Figure 29:
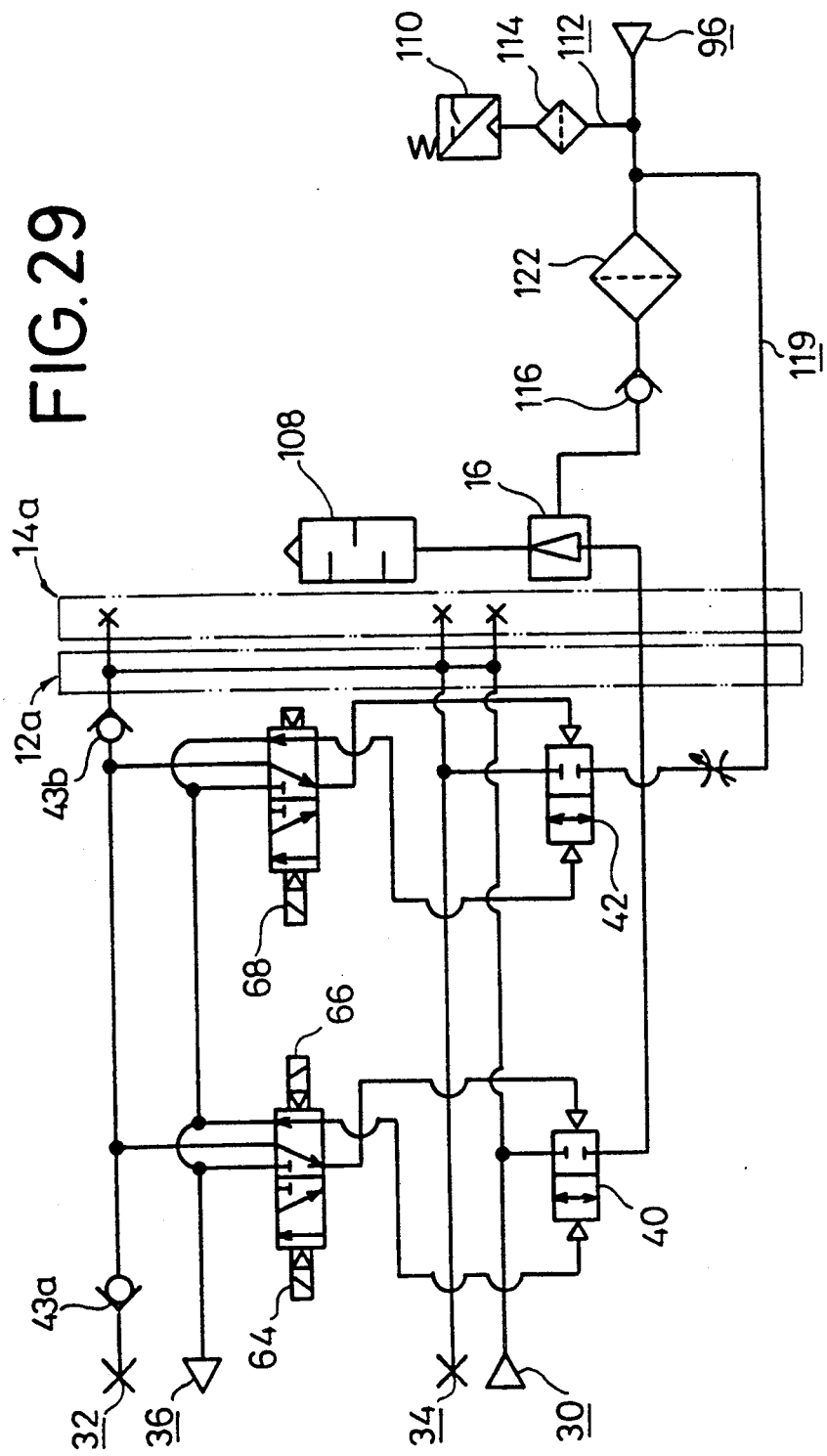
FIG. 29 is a view for describing a fluid circuit of a vacuum feeding apparatus with an ejector incorporated therein according to a seventh embodiment of the present invention.

The operation of the vacuum feeding apparatus constructed as described above will now be described with reference to FIGS. 26 and 29.

In a seventh embodiment, pressurized fluid to be supplied is first limited to one kind. A description will be made of a vacuum feeding apparatus 24a with an ejector incorporated therein. The pressurized fluid, e.g., compressed air is supplied from a feed port 30 of a valve unit 10a and discharged from an exhaust port 36 of a valve mechanism 26 of the valve unit 10a. Thus, a feed port 32 for a pilot valve, of the valve mechanism 26 and a vacuum break port 34a are blocked by screws respectively (see FIG. 29). When a work or the like is attracted by a suction pad so as to be fed to a desired position under this condition, an unillustrated compressed-air feed source such as a compressor is first energized to supply compressed air to the feed port 30 of the valve mechanism 26 so as to reach a third chamber 236 of a function plate 12a. Since a packing 230a is partly cut off, the third through fifth chambers 236, 238, 240 of the function plate 12a communicate with one another (see FIGS. 26 and 29). Therefore, the compressed air flows into the fourth and fifth chambers 238, 240 from the third chamber 236 of the function plate 12a, followed by supplying to a vacuum break valve 42 and first through third solenoid-controlled pilot valves 64, 66, 68. Accordingly, a change in passages or channels of the valve mechanism 26 can be made by simply inserting the function plate 12a between a connecting plate 14a and the vacuum feeding apparatus, thereby enabling an efficient pipe arrangement.

Figure 30:
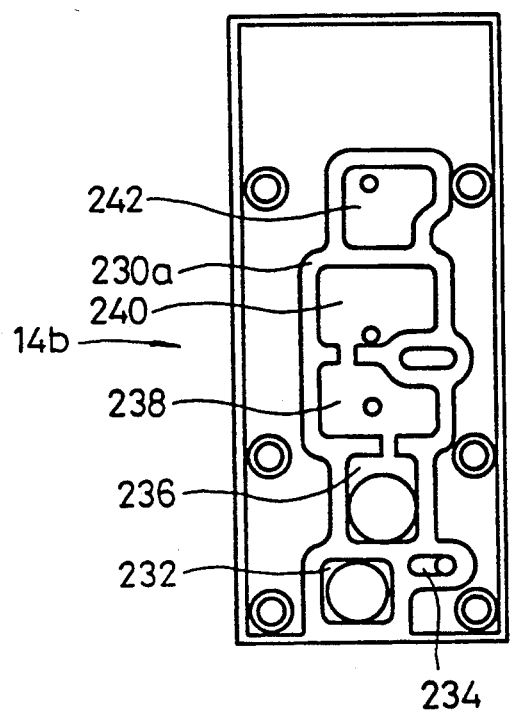
FIG. 30 is a front view illustrating a second function plate of the vacuum feeding apparatus according to the present invention.
Figure 31:
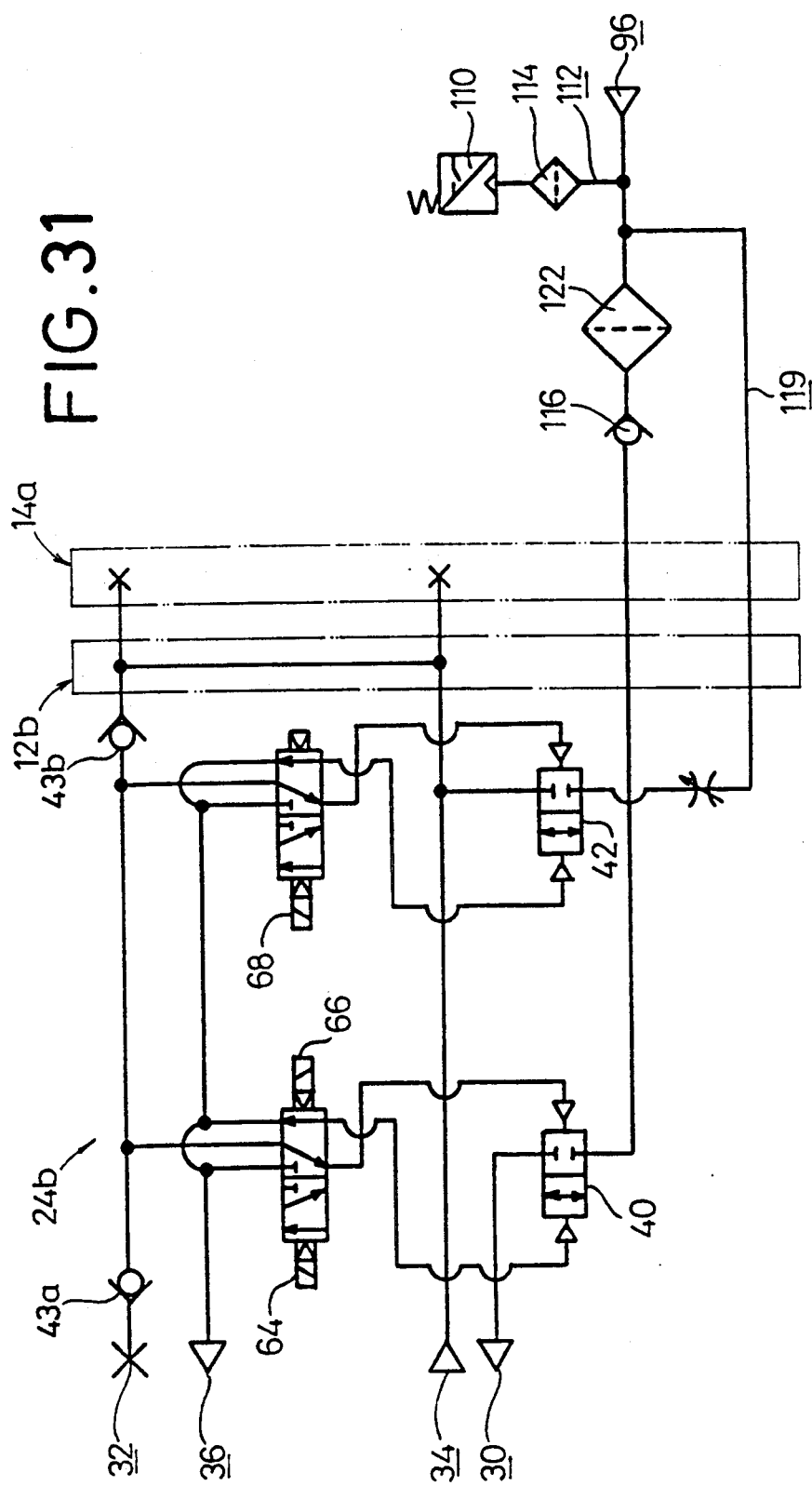
FIG. 31 is a view for describing a fluid circuit of a vacuum feeding apparatus with a vacuum pump externally incorporated therein according to an eighth embodiment of the present invention.

Similarly, a vacuum feeding apparatus 24b with a vacuum pump externally connected thereto will now be described as a eighth embodiment. In this case, a function plate 12b is inserted between a connecting plate 14a and the vacuum feeding apparatus for the purpose similar to that of the seventh embodiment. As illustrated in FIG. 30, the function plate 12b is constructed substantially in the same manner as the function plate 12a. However, a packing 244a on a valve unit 10a side is partially cut off to cause fourth and fifth chambers 238, 240 to communicate with each other. Even in this case, the efficiency in the pipe arrangement can be improved by blocking a feed port 32 for a pilot valve with screws (see FIG. 31).

Further, in manifold correspondence-type vacuum feeding apparatus 24c, a change in passages or channels of a valve mechanism 26 are performed by a combination of a connecting plate and a function plate. Then, vacuum feeding apparatuses 24c will be described as ninth and tenth embodiments.

Figure 32:
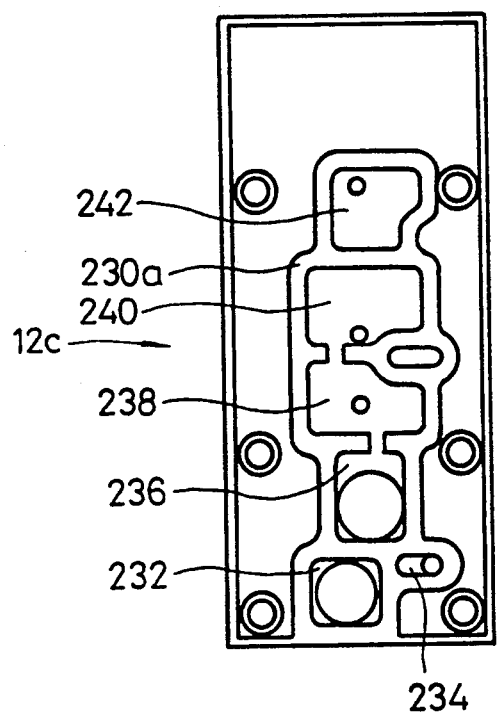
FIG. 32 is a front view showing a third function plate of the vacuum feeding apparatus according to the present invention.
Figure 33:
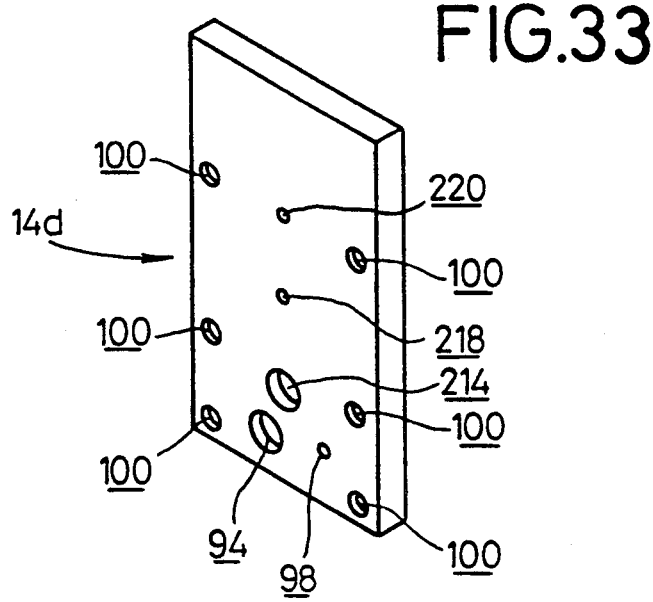
FIG. 33 is a perspective view illustrating a fourth connecting plate of the vacuum feeding apparatus according to the present invention.
Figure 34:
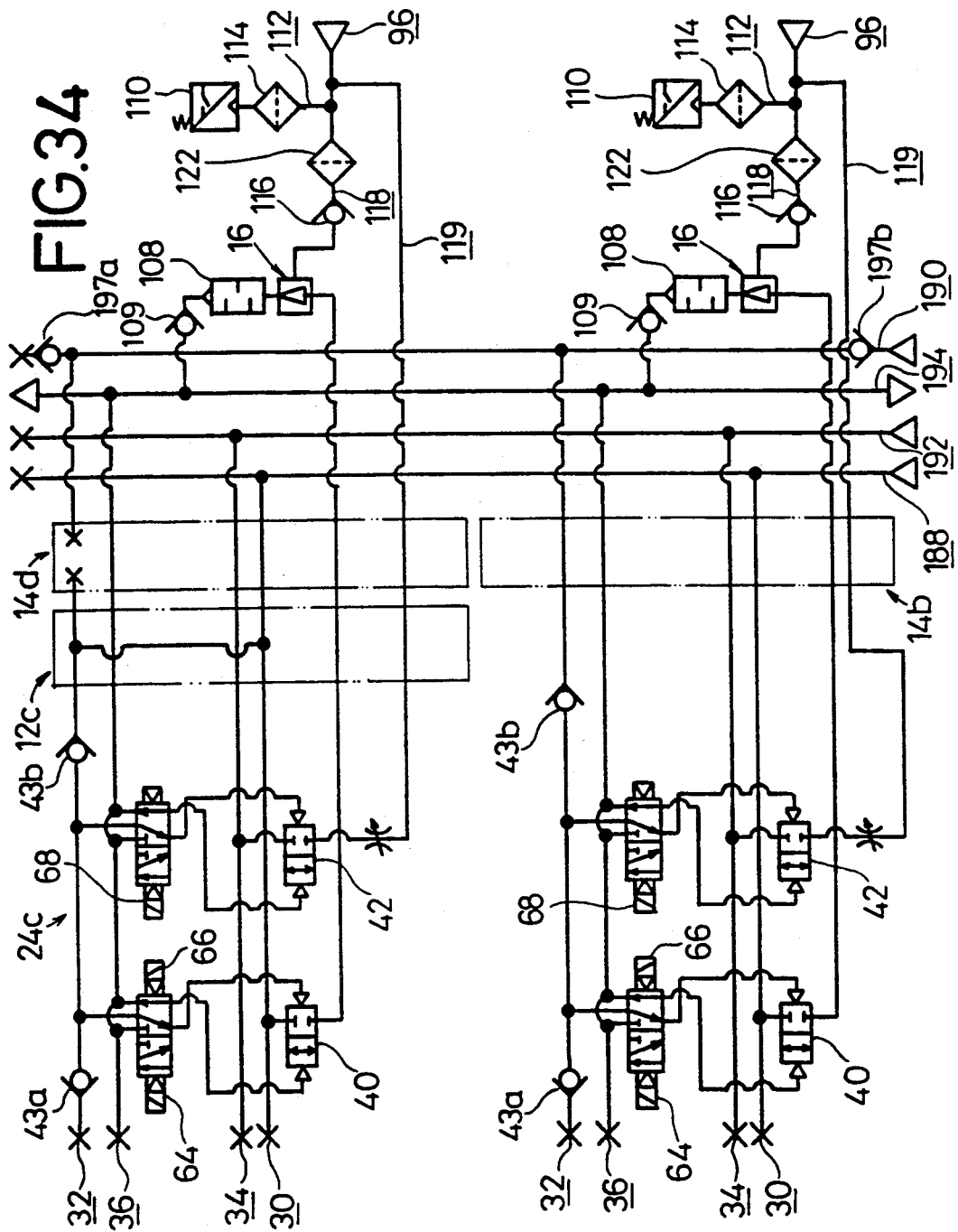
FIG. 34 is a view for describing a fluid circuit of a vacuum feeding apparatus with an ejector incorporated therein according to a ninth embodiment of the present invention.
Figure 35:
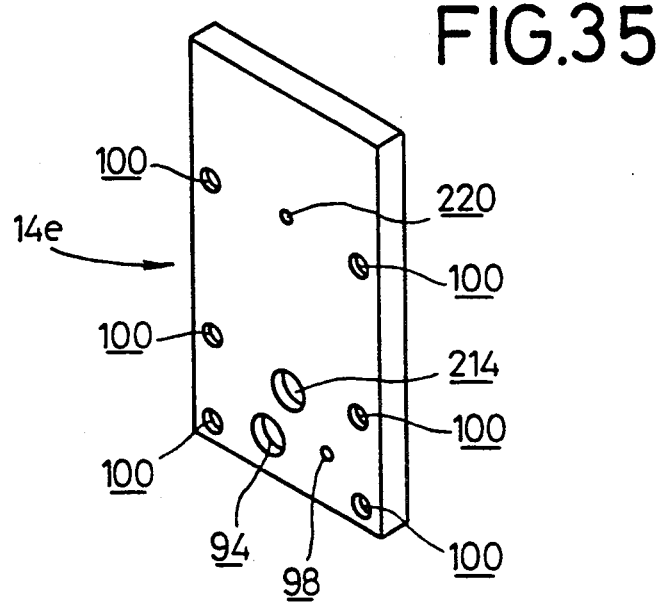
FIG. 35 is a perspective view showing a fifth connecting plate of the vacuum feeding apparatus according to the present invention.
Figure 36:
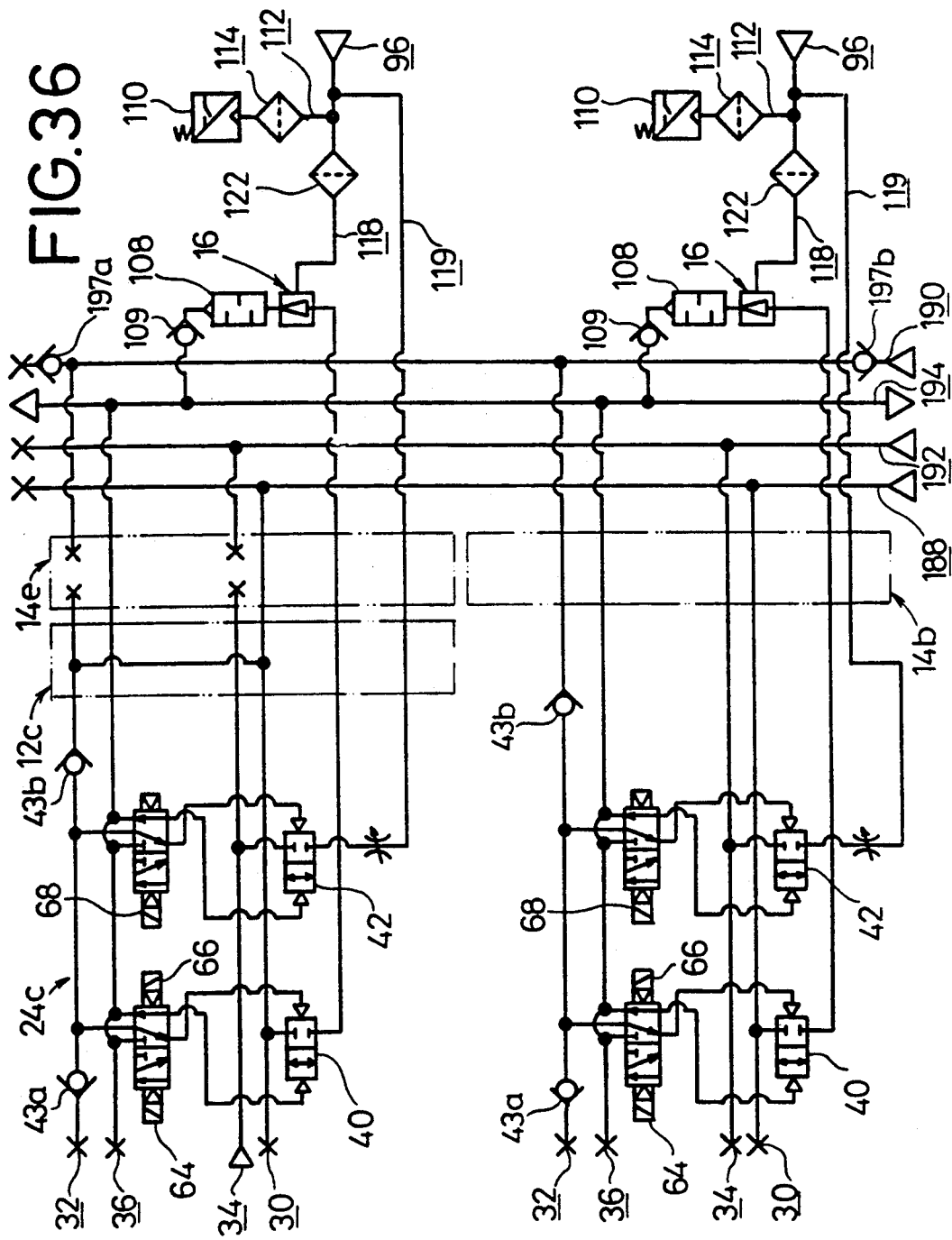
FIG. 36 is a view for describing a fluid circuit of a vacuum feeding apparatus with an ejector incorporated therein according to a tenth embodiment of the present invention.

Similarly to the sixth embodiment, the nitrogen or the like is used for a vacuum break when a work such as an IC substrate is employed. In addition, compressed air is used for purposes other than the vacuum break. In this case, a function plate 12c is used. The function plate 12c is constructed substantially in the same manner as the function plate 12a. However, a packing 246a on a valve unit 10a side is partly cut off so as to cause a third chamber 236 and a fourth chamber 238 to communicate with each other (see FIG. 32). When the nitrogen flows through a vacuum break passage 192 of a manifold 22, a connecting plate 14d is disposed in confronting relationship to the function plate 12c. The connecting plate 14d has a shape from which the fifth hole 216 of the connecting plate 14b is omitted (see FIG. 33). Thus, the connecting plate 14d serves to block or cut off a feed passage 190 for a pilot valve, of the manifold 22 and the fourth chamber 238 of the function plate 12c (see FIG. 34). The compressed air is supplied to a feed valve 40 and first through solenoid-controlled pilot valves 64, 66, 68 through a feed passage 188 of the manifold 22. It is needless to say that unused respective ports 30, 32, 34, 36 of the valve mechanism 26 are blocked by screws respectively. Further, when the compressed air flows into the vacuum break passage 192 of the manifold 22, a connecting plate 14e is disposed in confronting relationship to a function plate 12c. The connecting plate 14e has a configuration from which the fifth and sixth holes 216, 218 of the connecting plate 14b are removed (see FIG. 35). Accordingly, the connecting plate 14e serves to block or cut off a feed passage 190 for a pilot valve, of a manifold 22, a vacuum break passage 192 of the manifold 22, and fourth and fifth chambers 238, 240 of a function plate 12c (see FIG. 36). The nitrogen is supplied from a vacuum break port 34 of a vacuum mechanism 26. Unused respective ports 30, 32, 36 of the valve mechanism 26 are blocked with screws respectively. It is needless to say that the present embodiment can be applied even to a vacuum feeding apparatus 24d with a vacuum pump connected thereto.

In the vacuum feeding apparatuses 24a through 24d as described above, the function plates 12a through 12c and the connecting plates 14a through 14e are suitably used in combination as needed. Alternatively, the connecting plates 14a through 14e are used singly. As a consequence, a change in the internal passages or channels of the valve mechanism 26 of the valve unit 10a or a change in the pipe arrangement with respect to the valve mechanism 26 can be performed. It is needless to say that such processes can be applied even to the valve units 10b, 10c different from each other.

Further, the first and second interfaces 27, 28 are inserted in space between the valve mechanism 26 of the valve unit 10 and the solenoid-controlled pilot valve unit 29 and are suitably rearranged so as to make a change in the passages or channels of the valve mechanism 26 and the solenoid-controlled pilot valve unit 29, thereby carrying out a change in a system of the pilot valve. Thus, the system of the pilot valve mounted in an upper position can be modified by making alterations in the first and second interfaces 27, 28, thereby making it possible to change the valve unit 10 to valve units such as the valve units 10b, 10c which are of air-operated and normally-open types respectively.

Figure 37:
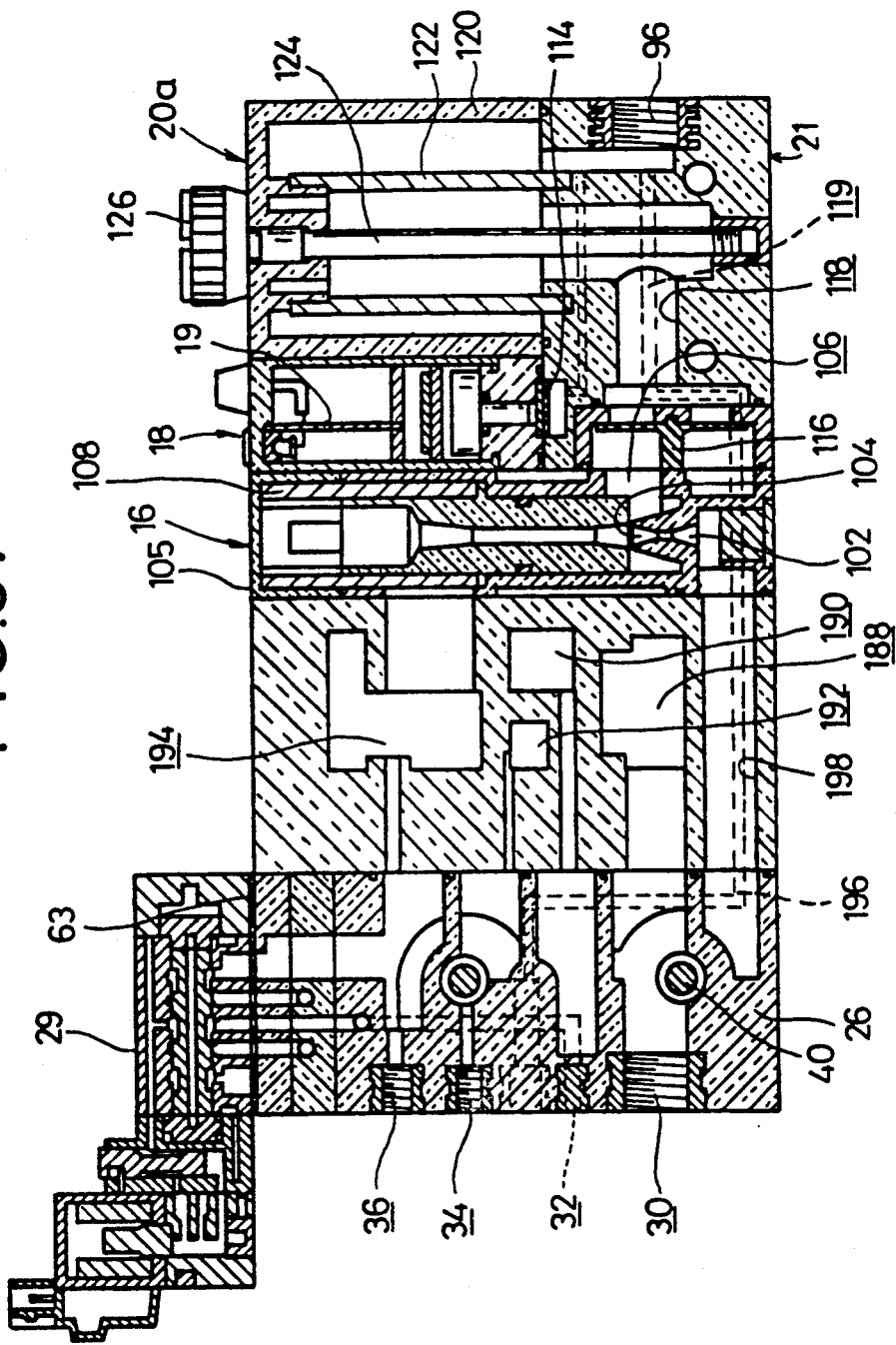
FIG. 37 is a vertical cross-sectional view showing an embodiment of the present invention other than the first to tenth embodiments.

FIG. 37 shows an embodiment of the present invention other than the above-described embodiments. In this embodiment, a valve unit 10, a manifold unit 22, an ejector unit 16, a pressure detecting unit 18, and filter units 20a, 20b are formed of transparent materials such as an acrylic resin so as to be formed in integral form. This purpose is to confirm internally-produced cloggings or the like. As is easily understood from the drawing, both of a nozzle and a diffuser have been made transparent.

Figure 38:
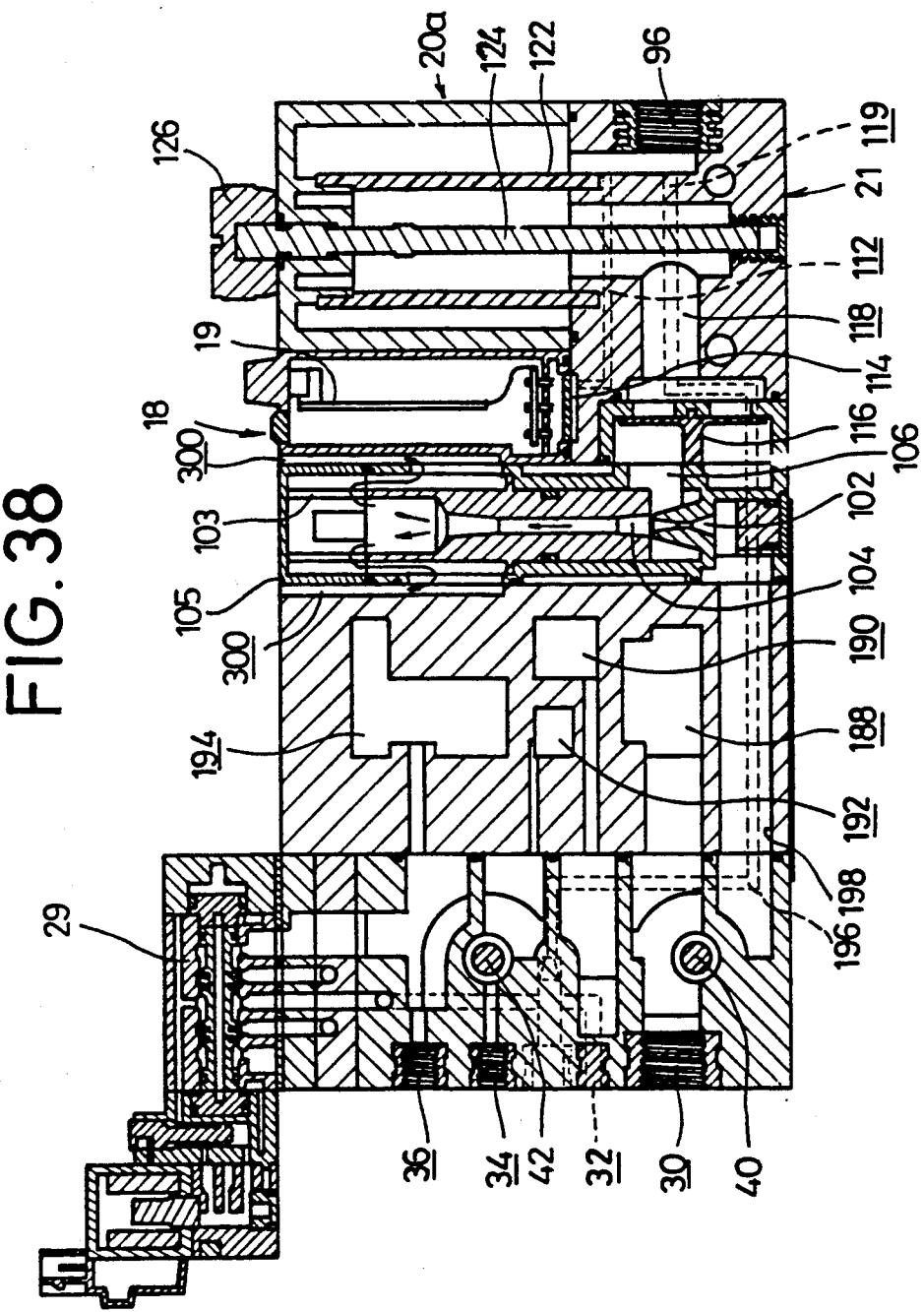
FIG. 38 is a vertical cross-sectional view illustrating an embodiment of the present invention other than the embodiment shown in FIG. 37 and the first to tenth embodiments.

FIG. 38 illustrates an embodiment of the present invention other than the embodiment shown in FIG. 37 and the previously-described embodiments. In the present embodiment, spaces 300, 300 are defined between an ejector body and another component, e.g., between a manifold block 14 and a pressure detecting unit 16 so as to achieve a silencing effect within an air flow passage indicated by arrow. In addition, the number of parts to be used can be reduced.

According to the present invention, a single vacuum feeding apparatus 24 can be changed to one of either an ejector type or a vacuum pump type by slightly rearranging components of the vacuum feeding apparatus 24. In addition, the vacuum feeding apparatus 24 can be provided in continuation in plural form by providing a corresponding manifold 22. Furthermore, a change in passages or channels or a change in pipe arrangement can be performed without making a change in a valve mechanism 26 of a valve unit 10 by replacing a connecting plate with another. That is, the vacuum feeding apparatus is constructed by combining components together in the form of blocks or units for every functions. Therefore, the vacuum feeding apparatus can be changed to any one of an ejector type, a vacuum pump type and a manifold correspondence-type at a minimum of rearrangement of components. In addition, a change in passages or channels and a change in arrangement of lines or pipes coupled to a valve mechanism can be performed without replacing the valve mechanism with another by inserting a plate in space between a valve mechanism of a valve unit and a different member adjacent thereto. Accordingly, users can easily alter a vacuum feeding apparatus with a small amount of stocks and utilize the altered apparatus in a reduced size for various uses according to purposes to be used.

Having now fully described the invention, it will be apparent to those skilled in the art that many changes and modifications can be made without departing from the spirit or scope of the invention as set forth herein.

What is claimed is:

1. A vacuum feeding apparatus including a suction pad for holding and conveying a workpiece to a desired position, comprising:
   a vacuum unit for supplying a vacuum to said suction pad;
   a valve unit for supplying and cutting a pressurized fluid and said vacuum to and from desired portions of said apparatus, said valve unit including a directional control valve for supplying said pressurized fluid or said vacuum and cutting off the same, a pilot valve for controlling said directional control valve, and a plate mounted between said directional control valve and said pilot valve so as to selectively make a changeover of a fluid passage for enabling said directional control valve and said pilot valve to communicate with each other and to cut off said fluid passage; and
   a filter unit for removing dust from a fluid introduced into said apparatus through said suction pad.

2. A vacuum feeding apparatus according to claim 1, wherein said vacuum unit and a vacuum pump can selectively be coupled to each other.

3. A vacuum feeding apparatus according to claim 1, wherein said directional control valve includes a valve seat and a valve body, said valve body having circumferential grooves which are defined in both ends thereof and in which first and second flexible rings are mounted, and having an intermediate portion on which a third flexible ring having one slanted side face is fixedly mounted, whereas said valve seat having opposed pointed-ends brought into abutment against said slanted face of said third flexible ring when said valve body is blocked against said valve seat.

4. A vacuum feeding apparatus according to claim 1, wherein said plate is exchanged with another plate so as to connect said valve unit and said pilot valve to each other in a manner that they are kept airtight and to selectively cut off a plurality of fluid passages defined between said valve unit and said member.

5. The vacuum feeding apparatus of claim 1, wherein said plate is exchangeable.

6. A vacuum feeding apparatus according to claim 1, wherein said plate is exchanged with another so as to couple said valve unit and said pilot valve to each other in such a manner that they are kept airtight, to selectively cut off a plurality of fluid passages defined between said valve unit and said pilot valve.

7. A vacuum feeding apparatus according to claim 6, wherein said plate is part of plate means which comprises first and second plates, wherein:
   said first plate used to couple said valve unit and a member having a fluid passage which is defined therein and communicates with said valve unit to each other in such a manner that said valve unit and said member are kept airtight, said first plate being exchanged with another plate so as to selectively cut off a plurality of fluid passages defined between said valve unit and said member; and
   said second plate exchanged with still another plate thereby to make it possible to selectively perform the changeover of a plurality of fluid passages in said valve unit;
   whereby said first and second plates are used in combination so as to selectively cut off sand plurality of fluid passages defined between said valve unit and said member.

8. A vacuum feeding apparatus according to claim 1, wherein said valve unit includes sealing members which are of floating type diaphragms formed of ring-shaped flexible materials and inserted in recesses defined in both of a valve body and a valve seat.

9. A vacuum feeding apparatus according to claim 8, wherein said recesses defined in said valve body and said valve seat respectively are positionally displaced in the direction in which said valve body is moved so as to obliquely fit and place said floating type diaphragms in said respectively corresponding recesses.

10. A vacuum feeding apparatus according to claim 1, wherein said valve unit includes a poppet valve which includes a valve body and a valve seat, said valve body having circumferential grooves which are defined in both ends thereof and in which first and second flexible rings are mounted, and having an intermediate portion on which a third flexible ring having one slanted side face is fixedly mounted, whereas said valve seat having opposed pointed-ends brought into abutment against said slanted face of said third flexible ring when said valve body is blocked against said valve seat.

11. A vacuum feeding apparatus according to claim 10, wherein said valve seat is formed of a synthetic resin in integral form.

12. A vacuum feeding apparatus according to claim 1, wherein said pilot valve is held in an actuated state when a power failure occurs.

13. A vacuum feeding apparatus according to claim 12, wherein said pilot valve includes first and second solenoids and serves as a solenoid-controlled pilot valve firstly actuated to control said directional control valve so as to supply a vacuum therefrom when said first solenoid is energized and then actuated to control said directional control valve so as to cut off the supply of the vacuum therefrom when said second solenoid is energized.

14. A vacuum feeding apparatus according to claim 13, wherein said vacuum unit is an ejector.

15. A vacuum feeding apparatus according to claim 13, wherein vacuum unit is a vacuum pump.

16. A vacuum feeding apparatus according to claim 1, wherein said vacuum unit is an ejector.

17. A vacuum feeding apparatus according to claim 16, wherein a plurality of vacuum units have a supply of the pressurized fluid and exhaust in common through a manifold.

18. A vacuum feeding apparatus according to claim 15, further including a manifold and wherein a check valve for preventing exhaust from flowing into said ejector from an exhaust passage of said manifold is disposed between the exhaust passage of said manifold and said ejector.

19. A vacuum feeding apparatus according to claim 16, wherein a check valve for preventing air in said valve unit from flowing is disposed in a passage which communicates with a compressed-air intake port of said ejector.

20. A vacuum feeding apparatus according to claim 16, further including a manifold which includes two or more surfaces for mounting thereon external devices which communicate with said manifold via piping spaces internally defined in said manifold, said manifold including fluid passages which are defined in said two or more surfaces in an open state and communicate with said external devices respectively, and having a packing groove and mounting internally-threaded bores defined in integral form.

21. A vacuum feeding apparatus according to claim 20, wherein said manifold is formed of a synthetic resin in integral form.

22. A vacuum feeding apparatus according to claim 16, wherein a space is defined between said ejector and a different member disposed adjacent to said ejector in such a manner as to communicate with a diffuser of said ejector and serve as a fluid exhaust passage for reducing a fluid exhaust sound.

23. A vacuum feeding apparatus according to claim 22, wherein said different member disposed adjacent to said ejector is of a detecting unit for detecting a vacuum.

24. A vacuum feeding apparatus according to claim 22, wherein said different member disposed adjacent to said ejector is of a manifold.

25. A vacuum feeding apparatus according to claim 1, wherein fluid passages for allowing a component provided inside any one of said units to communicate with fluid devices are perceptible to vision.

26. A vacuum feeding apparatus according to claim 25, wherein a body of said component is formed of a transparent synthetic resin in the form of a single unit.

27. The vacuum feeding apparatus of claim 25, wherein said component is a valve.

28. The vacuum feeding apparatus of claim 25, wherein said component is a silencer element.

29. The vacuum feeding apparatus of claim 25, wherein said component is a filter element.

30. The vacuum feeding apparatus of claim 25, wherein said component is a check valve.

31. A vacuum feeding apparatus according to claim 25, wherein said component is a nozzle.

32. The vacuum feeding apparatus of claim 31, wherein said nozzle is formed of a transparent material and fluid passages defined in said nozzle are perceptible to vision.

33. The vacuum feeding apparatus of claim 25, wherein said component is a diffuser.

34. The vacuum feeding apparatus of claim 38, wherein said diffuser is formed of a transparent material and fluid passages defined in said diffuser are perceptible to vision.

* * * * *